United States Patent
Yang

(10) Patent No.: US 11,711,680 B2
(45) Date of Patent: Jul. 25, 2023

(54) VEHICLE-TO-VEHICLE MANEUVER SHARING AND COORDINATING

(71) Applicant: QUALCOMM Incorporated, San Diego, CA (US)

(72) Inventor: Seung Ryul Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 137 days.

(21) Appl. No.: 17/238,577

(22) Filed: Apr. 23, 2021

(65) Prior Publication Data
US 2021/0385630 A1 Dec. 9, 2021

Related U.S. Application Data

(60) Provisional application No. 63/036,807, filed on Jun. 9, 2020.

(51) Int. Cl.
*H04W 4/46* (2018.01)
*H04W 4/021* (2018.01)
*H04W 4/12* (2009.01)
*H04W 4/029* (2018.01)

(52) U.S. Cl.
CPC .............. *H04W 4/46* (2018.02); *H04W 4/021* (2013.01); *H04W 4/029* (2018.02); *H04W 4/12* (2013.01)

(58) Field of Classification Search
CPC ....... G08G 1/096741; G08G 1/096791; G08G 1/096716; G08G 1/09675; H04W 4/24; H04W 4/029; H04W 4/46; H04W 4/021; H04W 4/12; H04W 4/40; H04W 4/023
See application file for complete search history.

(56) References Cited

U.S. PATENT DOCUMENTS

| | | | |
|---|---|---|---|
| 10,252,721 B1 | 4/2019 | Bai | |
| 2011/0304425 A1* | 12/2011 | Iyer | H04W 4/38 340/5.8 |
| 2013/0099911 A1* | 4/2013 | Mudalige | G08G 1/166 701/23 |

(Continued)

FOREIGN PATENT DOCUMENTS

| | | | |
|---|---|---|---|
| CN | 107274720 A | 10/2017 | |
| DE | 102019216913 A1 * | 5/2021 | ............. G08G 1/093 |

(Continued)

OTHER PUBLICATIONS

International Search Report and Written Opinion—PCT/US2021/031064—ISA/EPO—dated Aug. 20, 2021.

*Primary Examiner* — Congvan Tran
(74) *Attorney, Agent, or Firm* — Harrity & Harrity, LLP

(57) ABSTRACT

Various aspects of the present disclosure generally relate to wireless communication. In some aspects, a user equipment may transmit a maneuver message for a maneuver of a vehicle associated with the UE; perform a negotiation, with one or more other UEs, associated with the maneuver message, wherein the negotiation includes at least one of: indicating, in the maneuver message, one or more remote vehicle maneuvers, or receiving, from a UE of the one or more other UEs, a response to the maneuver message indicating a suggested maneuver for the vehicle of the UE; and perform an action based at least in part on performing the negotiation. Numerous other aspects are provided.

28 Claims, 10 Drawing Sheets

(56) References Cited

U.S. PATENT DOCUMENTS

| | | | |
|---|---|---|---|
| 2018/0308360 A1* | 10/2018 | Regmi | G08G 1/162 |
| 2019/0164424 A1 | 5/2019 | Kleen et al. | |
| 2019/0245647 A1* | 8/2019 | Alieiev | H04L 1/0017 |
| 2020/0084278 A1* | 3/2020 | Cheng | H04W 4/44 |
| 2020/0193829 A1* | 6/2020 | Cheng | G08G 1/168 |
| 2020/0249683 A1* | 8/2020 | Rosales | G08G 1/166 |
| 2021/0245758 A1* | 8/2021 | Ahmad | G08G 1/166 |
| 2022/0105954 A1* | 4/2022 | Li | H04W 4/44 |
| 2022/0210688 A1* | 6/2022 | Baglin | H04W 28/0268 |

FOREIGN PATENT DOCUMENTS

| | | | | |
|---|---|---|---|---|
| EP | 3614354 A1 | 2/2020 | | |
| GB | 2593915 A | * 10/2021 | | B60W 30/18009 |

* cited by examiner

US 11,711,680 B2

VEHICLE-TO-VEHICLE MANEUVER SHARING AND COORDINATING

CROSS-REFERENCE TO RELATED APPLICATION

This Patent Application claims priority to U.S. Provisional Patent Application No. 63/036,807, filed on Jun. 9, 2020, entitled "VEHICLE-TO-VEHICLE MANEUVER SHARING AND COORDINATING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for vehicle-to-vehicle (V2V) maneuver sharing and coordinating.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting a maneuver message for a maneuver of a vehicle associated with the UE; performing a negotiation, with one or more other UEs, associated with the maneuver message, wherein the negotiation includes at least one of: indicating, in the maneuver message, one or more remote vehicle (RV) maneuvers, or receiving, from a UE of the one or more other UEs, a response to the maneuver message indicating a suggested maneuver for the vehicle of the UE; and performing an action based at least in part on performing the negotiation.

In some aspects, a method of wireless communication, performed by a UE, may include receiving, from a different UE, a maneuver message for a maneuver for a vehicle associated with the different UE; and performing a negotiation, with the different UE, associated with the maneuver message, wherein the negotiation includes at least one of: identifying, in the maneuver message, an RV maneuver for a vehicle associated with the UE, or transmitting, to the different UE, a response to the maneuver message indicating a suggested maneuver for the vehicle associated with the different UE.

In some aspects, a UE for wireless communication may include a memory and one or more processors coupled to the memory. The one or more processors may be configured to transmit a maneuver message for a maneuver of a vehicle associated with the UE; perform a negotiation, with one or more other UEs, associated with the maneuver message, wherein the negotiation includes at least one of: indicate, in the maneuver message, one or more RV maneuvers, or receive, from a UE of the one or more other UEs, a response to the maneuver message indicating a suggested maneuver for the vehicle of the UE; and perform an action based at least in part on performing the negotiation.

In some aspects, a UE for wireless communication may include a memory and one or more processors coupled to the memory. The one or more processors may be configured to receive, from a different UE, a maneuver message for a maneuver for a vehicle associated with the different UE; and perform a negotiation, with the different UE, associated with the maneuver message, wherein the negotiation includes at least one of: identify, in the maneuver message, an RV maneuver for a vehicle associated with the UE, or transmit, to the different UE, a response to the maneuver message indicating a suggested maneuver for the vehicle associated with the different UE.

In some aspects, a non-transitory computer-readable medium may store one or more instructions for wireless communication. The one or more instructions, when executed by one or more processors of a UE, may cause the one or more processors to transmit a maneuver message for a maneuver of a vehicle associated with the UE; perform a negotiation, with one or more other UEs, associated with the maneuver message, wherein the negotiation includes at least one of: indicate, in the maneuver message, one or more RV maneuvers, or receive, from a UE of the one or more other UEs, a response to the maneuver message indicating a suggested maneuver for the vehicle of the UE; and perform an action based at least in part on performing the negotiation.

In some aspects, a non-transitory computer-readable medium may store one or more instructions for wireless communication. The one or more instructions, when executed by one or more processors of a UE, may cause the one or more processors to receive, from a different UE, a maneuver message for a maneuver for a vehicle associated with the different UE; and perform a negotiation, with the different UE, associated with the maneuver message, wherein the negotiation includes at least one of: identify, in the maneuver message, an RV maneuver for a vehicle associated with the UE, or transmit, to the different UE, a response to the maneuver message indicating a suggested maneuver for the vehicle associated with the different UE.

In some aspects, an apparatus for wireless communication may include means for transmitting a maneuver message for a maneuver of a vehicle associated with the apparatus; means for performing a negotiation, with one or more UEs, associated with the maneuver message, wherein the negotiation includes at least one of: means for indicating, in the maneuver message, one or more RV maneuvers, or means for receiving, from a UE of the one or more UEs, a response to the maneuver message indicating a suggested maneuver for the vehicle of the apparatus; and means for performing an action based at least in part on performing the negotiation.

In some aspects, an apparatus for wireless communication may include means for receiving, from a UE, a maneuver message for a maneuver for a vehicle associated with the UE; and means for performing a negotiation, with the UE, associated with the maneuver message, wherein the negotiation includes at least one of: means for identifying, in the maneuver message, an RV maneuver for a vehicle associated with the apparatus, or means for transmitting, to the UE, a response to the maneuver message indicating a suggested maneuver for the vehicle associated with the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
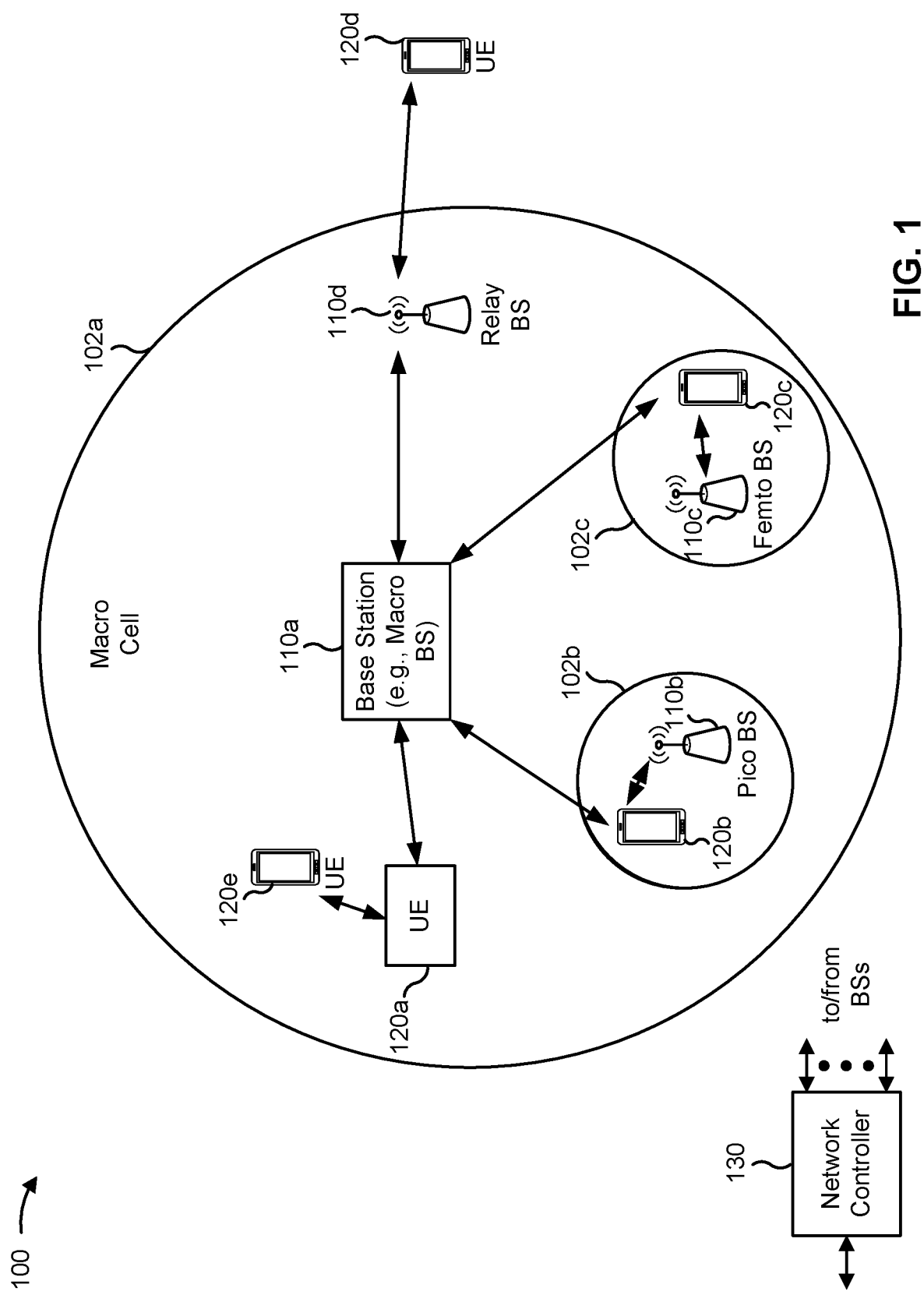
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or a vehicle-to-pedestrian (V2P) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
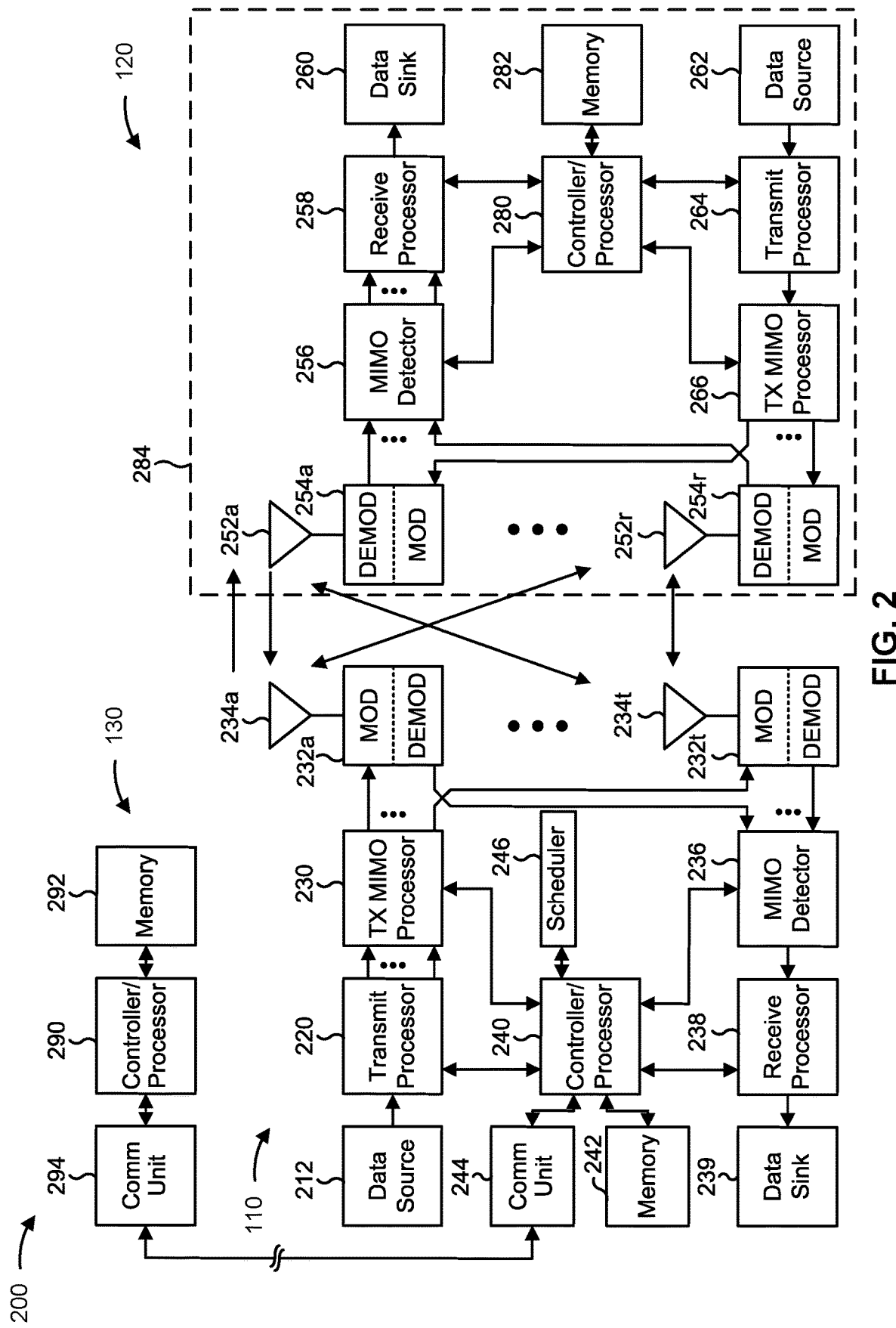
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10).

Controller/processor 240 of base station 110, controller/processor 280 of UE 120, and/or any other component(s) of FIG. 2 may perform one or more techniques associated with vehicle-to-vehicle (V2V) maneuver sharing and coordinating, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for transmitting a maneuver message for a maneuver of a vehicle associated with the UE, means for performing a negotiation, with one or more other UEs, associated with the maneuver message, wherein the negotiation includes at least one of: indicating, in the maneuver message, one or more remote vehicle (RV) maneuvers, or receiving, from a UE of the one or more other UEs, a response to the maneuver message indicating a suggested maneuver for the vehicle of the UE, means for performing an action based at least in part on performing the negotiation, and/or the like. In some aspects, UE 120 may include means for receiving, from a different UE, a maneuver message for a maneuver for a vehicle associated with the different UE, means for performing a negotiation, with the different UE, associated with the maneuver message, wherein the negotiation includes at least one of: identifying, in the maneuver message, an RV maneuver for a vehicle associated with the UE, or transmitting, to the different UE, a response to the maneuver message indicating a suggested maneuver for the vehicle associated with the different UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
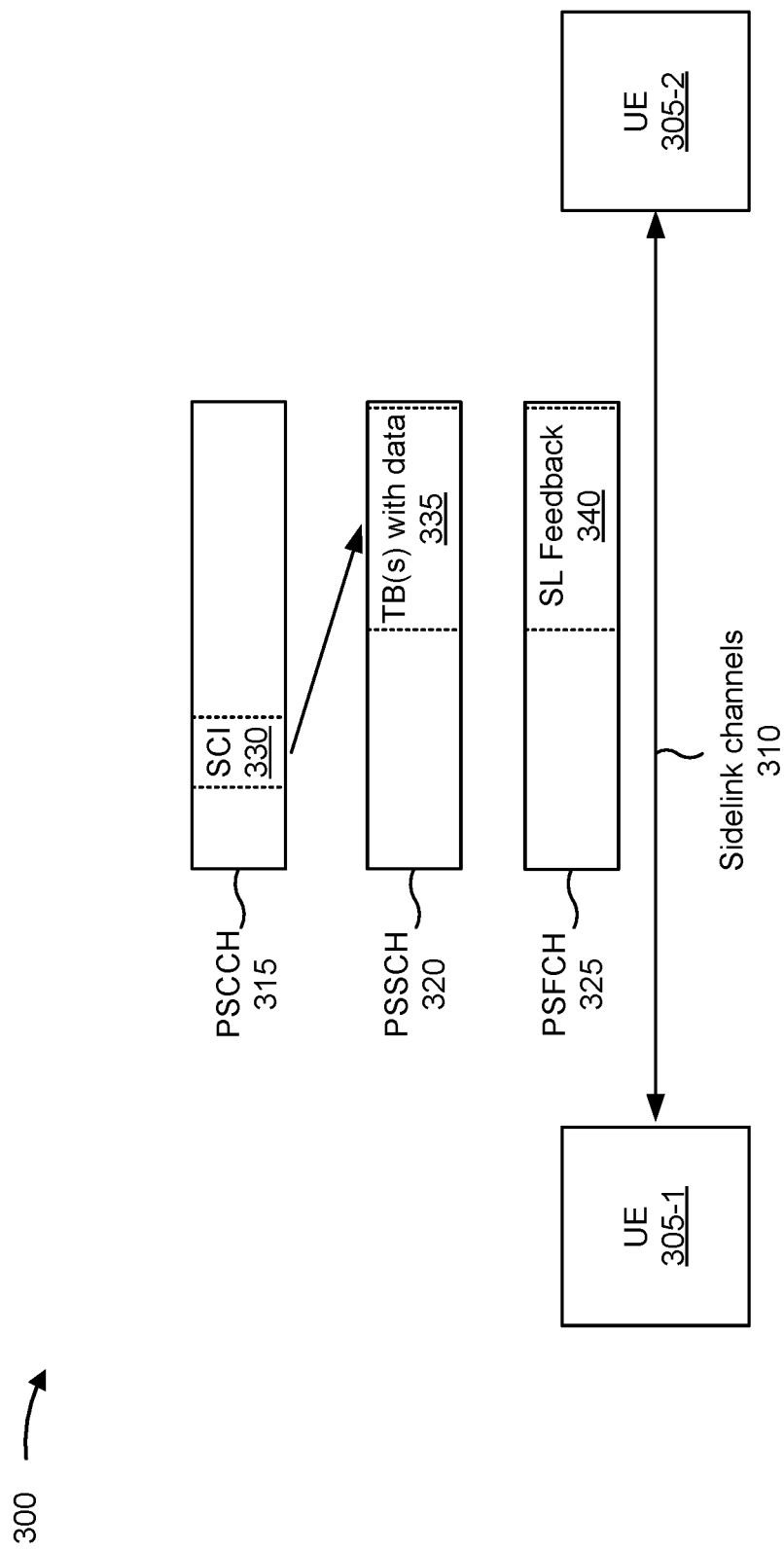
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
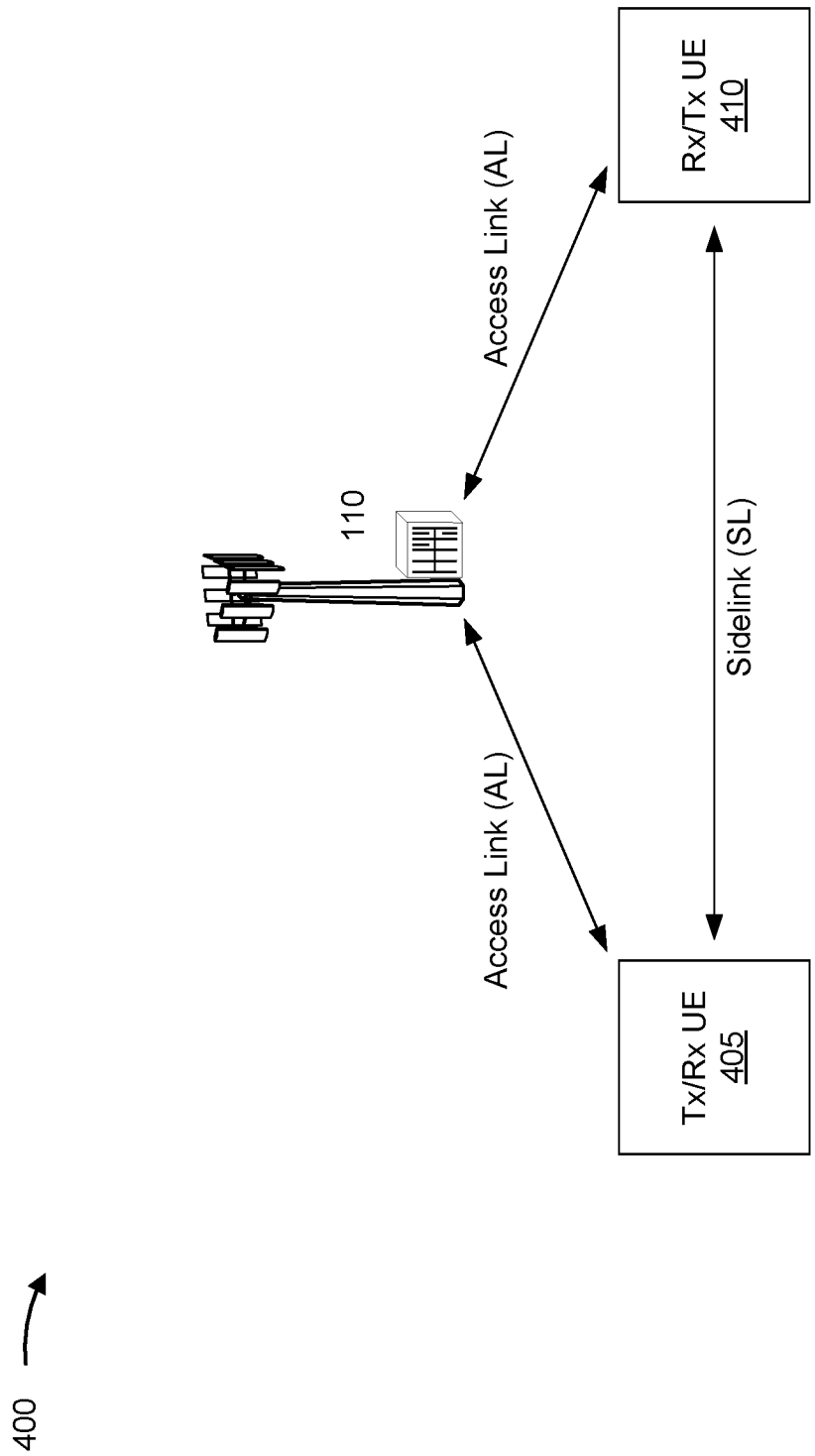
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In some wireless networks, UEs may communicate using a V2X protocol (e.g., which may include a V2V protocol, a V2I protocol, and/or the like). For example, a UE may be associated with a vehicle. The UEs of different vehicles may communicate to share and coordinate maneuvers between the different vehicles. However, it may be difficult to negotiate and coordinate maneuvers among a plurality of UEs associated with a plurality of vehicles due to the dynamic nature of moving vehicles. For example, an environment of a UE of a vehicle attempting to share and coordinate a maneuver may change rapidly. Additionally, negotiating between a plurality of UEs associated with a plurality of vehicles may consume network resources, processing resources, and/or the like associated with the negotiations.

Some techniques and apparatuses described herein enable efficient V2V maneuver sharing and coordinating among UEs of different vehicles. For example, a UE of a vehicle initiating a maneuver (e.g., a host vehicle) may transmit the request and indicate one or more road resources (e.g., areas of a road that the host vehicle proposes to move to) targeted for the maneuver (e.g., target road resources). Additionally, a UE may define the target road resource(s) using dynamic information. Moreover, one or more other UEs of other vehicles (e.g., remote vehicles) negotiating with the UE of the host vehicle may be enabled to determine that the remote vehicle is unable to conform to the maneuver of the host vehicle and may suggest a new or altered target road resource that may be acceptable. Further, a UE of a host vehicle may determine a maneuver for a remote vehicle, such that the UE of the host vehicle may coordinate multiple maneuvers among multiple vehicles (e.g., the host vehicle and one or more remote vehicles). As a result, the UEs (e.g., the UE of the host vehicle and one or more UEs of one or more remote vehicles) may efficiently share and coordinate maneuvers between each other. This may conserve network resources, processing resources, and/or the like that would have otherwise been used negotiating the maneuvers without using dynamic information and contextual information, without allowing multiple target road resources to be indicated in an initial maneuver request from a UE of a host vehicle, and/or the like.

Figure 5:
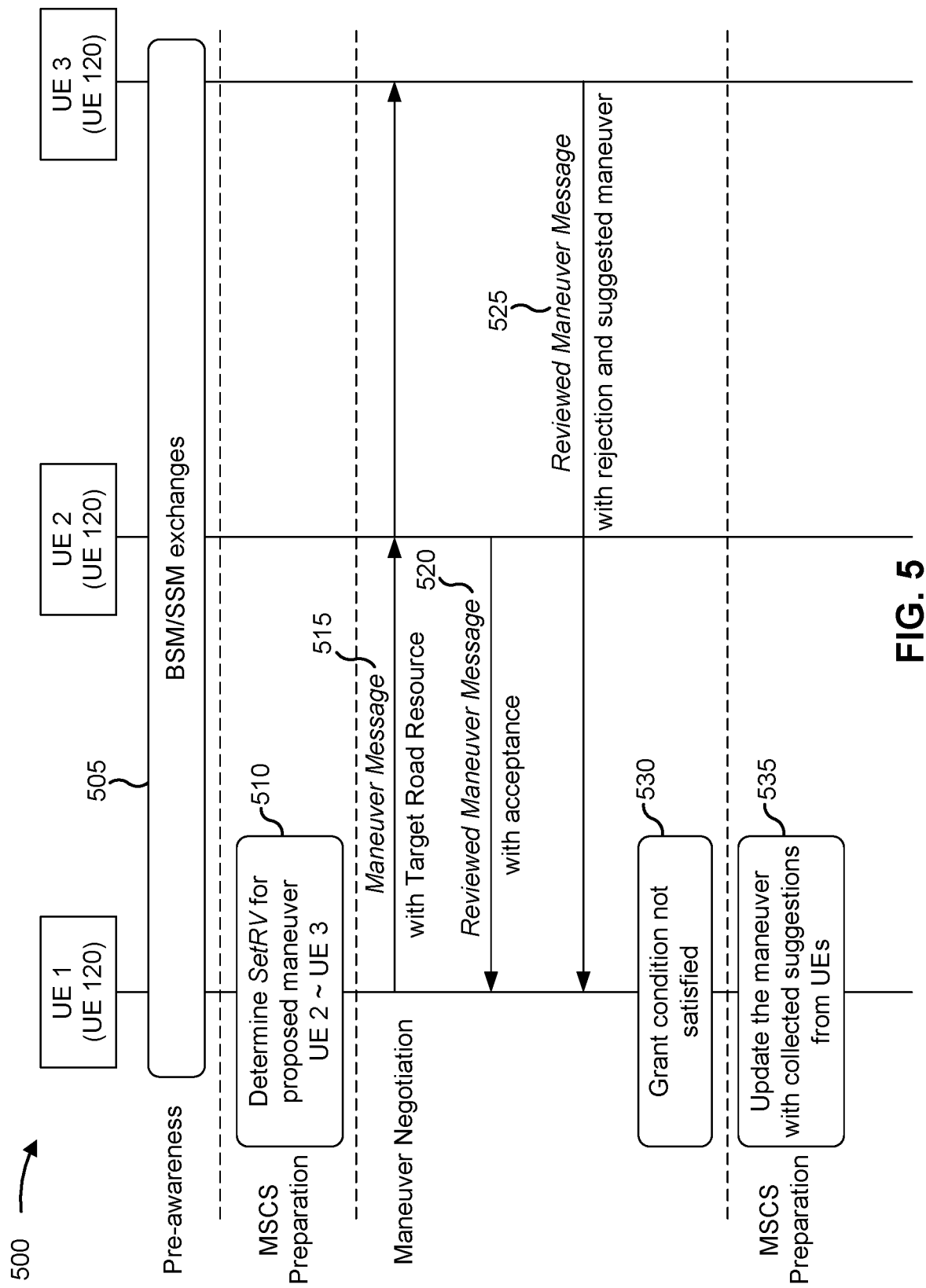
FIGS. 5-7 are diagrams illustrating examples associated with vehicle-to-vehicle (V2V) maneuver sharing and coordinating, in accordance with the present disclosure.

FIG. 5 is a diagram illustrating an example 500 of V2V maneuver sharing and coordinating, in accordance with the present disclosure. As shown in FIG. 5, one or more UEs 120 may communicate with one another. Each UE 120 may be associated with a vehicle. For example, a first UE 120 (e.g., UE 1) may be associated with a host vehicle (e.g., a vehicle that is initiating a maneuver). The remaining UEs 120 (e.g., UE 2, UE 3, and/or the like) may be associated with remote vehicles (e.g., vehicles that are involved in the negotiation of the maneuver with the host vehicle). As described herein, "communications between a host vehicle and one or more remote vehicles" may refer to communications between a UE 120 of the host vehicle and UEs 120 of the one or more remote vehicles.

As shown by reference number 505, the UEs 120 may transmit and receive basic safety messages (BSMs), sensor sharing messages (SSMs), and/or the like. The exchanging of BSMs and SSMs among the UEs 120 may be referred to as a pre-awareness state. A BSM may be a communication that indicates information regarding a vehicle's position, location, heading, speed, acceleration, and/or other information indicating a vehicle's state and/or predicted path. An SSM may be a communication that indicates information indicated by one or more sensors of a vehicle. The one or more sensors may indicate information (e.g., similar to the information indicated by a BSM) regarding the vehicle. The SSM may enable other UEs 120 to determine the information indicated by the one or more sensors of the vehicle transmitting the SSM. The UEs 120 may exchange BSMs and/or SSMs according to one or more technical standards, such as the Society of Automotive Engineers (SAE) International Standard J2945/1, J3161/1, and/or J3224, among other examples.

As shown by reference number 510, the first UE 120 (e.g., of the host vehicle) may determine a set of one or more UEs (e.g., a set of one or more remote vehicles, SetRV) for a maneuver (e.g., a proposed maneuver to be performed by the host vehicle). During this time, the first UE 120 may be in a preparation state (e.g., a maneuver sharing and coordinating service (MSCS) preparation state). The maneuver may indicate a target road resource associated with the maneuver. The target road resource may be an area of a road on which the host vehicle is travelling that is to be used to execute the maneuver (e.g., an area of the road that the host vehicle may occupy after completing the maneuver). The first UE 120 may determine the set of one or more UEs for the maneuver based at least in part on a relevant area associated with the maneuver.

The relevant area may be an area surrounding the target road resource that is large enough to include any remote vehicles on the road that may have a conflict with the maneuver. The relevant area may include distance ahead of the target road resource, a distance behind the target road resource, and/or a distance on each side of the target road resource. The size of the relevant area may be based at least in part on a speed of the host vehicle, a size of the host vehicle, a speed associated with a moving or dynamic target road resource, a maximum speed associated with the road on which the host vehicle is traveling, location characteristics of the target road resource, temporal characteristics of the target road resource, contextual characteristics of the target road resource, and/or the like.

The first UE 120 may determine that a UE 120 of a remote vehicle should be included in the set of one or more UEs for the maneuver based at least in part on determining that the UE 120 of the remote vehicle is located within the relevant area of the target road resource. The first UE 120 may determine the location of the UE 120 of the remote vehicle based at least in part on one or more BSMs received from the UE 120 of the remote vehicle, one or more SSMs received from the UE 120 of the remote vehicle, and/or the like. For example, as shown by reference number 510, the first UE 120 may determine that the second UE 120 and the third UE 120 are to be included in the set of one or more UEs 120 for the maneuver of the host vehicle.

As shown by reference number 515, the first UE 120 may transmit a maneuver message that indicates the maneuver, one or more target road resources associated with the maneuver, and/or the relevant area each target road resource of the one or more target road resources. In some aspects, the transmission of the maneuver message may be a broadcast transmission. In some aspects, the transmission of the maneuver message may not include the relevant area of the target road resource (e.g., a type 1 broadcast). In some aspects, the transmission of the maneuver message may include the relevant area of the target road resource (e.g., a type 2 broadcast). In some aspects, the transmission of the maneuver message may be a groupcast transmission to the UEs 120 included in the set of one or more UEs 120 for the maneuver. The groupcast transmission may be a transmission on a data link layer (e.g., Layer 2), a network layer (e.g., Layer 3) and/or a transport layer (e.g., Layer 4).

The maneuver message may indicate the target road resource using temporal information (e.g., an earliest time associated with the target road resource and/or a latest time associated with the target road resource), size information (e.g., length, width, height, radius, and/or the like), location information (e.g., latitude, longitude, elevation, and/or the like), and/or motion information (e.g., a heading, a speed, an acceleration, and/or the like), among other examples. The first UE 120 may determine a heading range of the target road resource based at least in part on a targeted heading range of the vehicle associated with the first UE 120 (e.g., the host vehicle) when executing the maneuver. The first UE 120 may determine a speed range associated with the target road resource of the one or more target road resources based at least in part on a targeted speed range of the host vehicle when executing the maneuver. The first UE 120 may determine an acceleration range associated with the target road resource of the one or more target road resources based at least in part on a targeted acceleration range of the host vehicle when executing the maneuver. The first UE 120 may indicate the target road resource using a lane identifier of a lane of the road in which the target road resource is located.

The first UE 120 may indicate the target road resource using dynamic location information. For example, the first UE 120 may determine a dynamic front location of the target road resource and/or a dynamic rear location of the target road resource. The dynamic front location of the target road resource and/or the dynamic rear location of the target road resource may be a position of the target road resource at a first time (e.g., an initial time, an anchor time, and/or the like). For example, the dynamic front location may be the front location of the target road at the first time. The dynamic rear location may be the rear location of the target road resource at the first time. The first UE 120 may indicate the dynamic front location of the target road resource, the dynamic rear location of the target road resource, the first time, and/or the speed associated with the target road resource. As a result, another UE (e.g., the second UE, the third UE, and/or the like) may be enabled to dynamically determine the location of the target road resource at a second time after the first time based at least in part on the dynamic front location of the target road resource, the dynamic rear location of the target road resource, the first time, and/or the speed associated with the target road resource.

As shown by reference number 520, the second UE 120 may respond to the maneuver message with a reviewed maneuver message. The reviewed maneuver message may indicate whether the proposed maneuver for the target road resource indicated in the maneuver message is accepted by the second UE 120 or rejected by the second UE 120. The second UE 120 may determine whether to accept or reject the proposed maneuver for the target road resource based at least in part on determining whether there is a risk of a collision between the vehicle associated with the second UE 120 (e.g., a remote vehicle) and the vehicle associated with the first UE 120 (e.g., the host vehicle). That is, the second UE 120 may review the proposed maneuver with the target road resource and may determine a likelihood of a collision between the remote vehicle of the second UE 120 and the host vehicle of the first UE 120 if the host vehicle were to execute the proposed maneuver. If the second UE 120 determines that there is no likelihood or a low likelihood of a collision between the remote vehicle of the second UE 120 and the host vehicle of the first UE 120 if the host vehicle were to execute the proposed maneuver, the second UE 120 may transmit a reviewed maneuver message indicating an acceptance of the maneuver message. Conversely, if second UE 120 determines that there is a likelihood or a high likelihood of a collision between the remote vehicle of the second UE 120 and the host vehicle of the first UE 120 if the host vehicle were to execute the proposed maneuver, the second UE 120 may transmit a reviewed maneuver message indicating a rejection of the maneuver message.

As shown by reference number 525, the third UE 120 respond to the maneuver message with a reviewed maneuver message. The reviewed maneuver message may indicate whether the proposed maneuver for the target road resource indicated in the maneuver message is accepted by the third UE 120 or rejected by the third UE 120. The third UE 120 may determine whether to accept or reject the maneuver message in a similar manner as described above with respect to the second UE 120.

In some aspects, if the third UE 120 determines the maneuver message is to be rejected, the third UE 120 may determine a suggested maneuver for the host vehicle (e.g., the vehicle of the first UE 120). The suggested maneuver may be based at least in part on the maneuver message, the target road resource, a location and/or trajectory of the vehicle associated with the third UE 120, and/or the like. For example, the suggested maneuver may identify a suggested road resource for the suggested maneuver. The suggested road resource may be a road resource that would be acceptable for the third UE 120 (e.g., such that if the target road resource was the same as the suggested road resource, the third UE 120 would accept the maneuver message). For example, the suggested road resource may identify one or more differences from the target road resource, such as a different time associated with the road resource, a different area or size of the road resource, a different speed of the road resource, a different position of the road resource, and/or the like.

The suggested road resource may be in a same format as the target road resource. That is, the suggested road resource may identify similar (or the same) information as the target road resource. In some aspects, the suggest road resource may be in a limited or reduced format. The limited or reduced format may only identify information that is different than information identified in the target road resource. For example, if the suggested road resource only differs from the target road resource by a time associated with the suggested road resource, the suggested road resource may only include information identifying the time associated with the suggested road resource.

As shown in FIG. 5, the transmission of the maneuver message and the one or more reviewed maneuver messages may occur during a maneuver negotiation phase. One or more actions performed during the maneuver negotiation phase may be referred to as performing a negotiation associated with the maneuver message.

As shown by reference number 530, the first UE 120 may determine a grant condition has not been satisfied. For example, the first UE 120 may determine a grant condition has not been satisfied if the first UE 120 has received a reviewed maneuver message a rejection of the maneuver message from any other UE 120. For example, as shown in FIG. 5, the third UE 120 may respond to the maneuver message with a reviewed maneuver message indicating a rejection of the maneuver message. As a result, the first UE 120 may determine that the grant condition has not been satisfied.

If the first UE 120 determines that the grant condition has not been satisfied, the first UE 120 may return to the pre-awareness state (e.g., exchanging BSMs and/or SSMs) or the preparation state (e.g., determining a new set of one or more UEs 120 for the proposed maneuver). In this way, the first UE 120 may enter a new negotiation for a new proposed maneuver if the initial maneuver has been rejected (e.g., the grant condition has not been satisfied). As a result, the negotiations for proposed maneuvers may be simplified, conserving time and/or processing resources that would have otherwise been used performing additional actions after determining that the initial maneuver has been rejected.

As shown by reference number 535, the first UE 120 may return to a preparation state. The first UE 120 may update the proposed maneuver identified in the maneuver message based at least in part on receiving one or more suggested maneuvers from one or more other UEs 120. For example, as described above, the third UE 120 may transmit a reviewed maneuver message indicating a suggested maneuver and/or a suggested road resource. The first UE 120 may update the target road resource included in the maneuver message based at least in part on the suggested road resource received from the third UE 120. For example, if the suggested road resource identified a different time than the time associated with the target road resource, the first UE 120 may update the target road resource with the different time identified in the suggested road resource. The first UE 120 may update the target road resource based at least in part on one or more other suggested road resources in a similar manner.

The first UE 120 may transmit a second maneuver message indicating the updated target road resource based at least in part on receiving the one or more suggested maneuvers from one or more other UEs 120. The first UE 120 and the one or more other UEs 120 may negotiate the updated maneuver in a similar manner as described above. As a result, the first UE 120 may receive an indication of a reason that a maneuver message was rejected (e.g., based at least in part on the differences in a suggested road resource from the target road resource) and may update target road resource based at least in part on the reason that the maneuver message was rejected. In this way, a likelihood that the second maneuver message is accepted (or that a grant condition associated with the second maneuver message will be satisfied) may be increased by updating the target road resource in this manner. This may conserve resources that would have otherwise been used by the first UE 120 transmitting a second maneuver message without any indications of a reason why the first maneuver message was rejected.

As indicated above, FIG. 5 is provided as an example. Other examples may differ from what is described with respect to FIG. 5.

Figure 6:
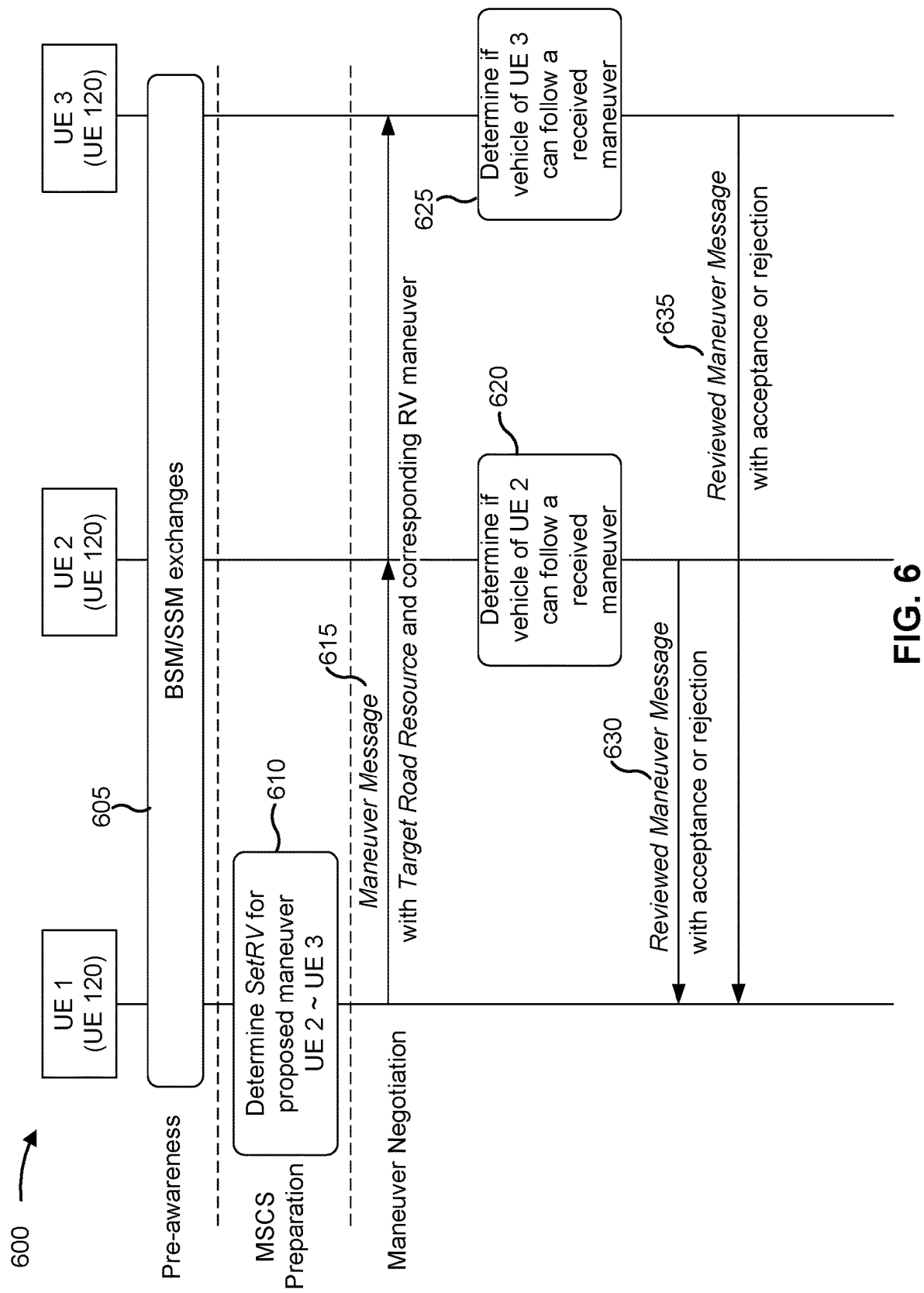

FIG. 6 is a diagram illustrating an example 600 of V2V maneuver sharing and coordinating, in accordance with the present disclosure. As shown in FIG. 6, one or more UEs 120 may communicate with one another. Each UE 120 may be associated with a vehicle. For example, a first UE 120 (e.g., UE 1) may be associated with a host vehicle (e.g., a vehicle that is initiating a maneuver). The remaining UEs 120 (e.g., UE 2, UE 3, and/or the like) may be associated with remote vehicles (e.g., vehicles that are involved in the negotiation of the maneuver with the host vehicle). As described herein, "communications between a host vehicle and one or more remote vehicles" may refer to communications between a UE 120 of the host vehicle and UEs 120 of the one or more remote vehicles.

As shown by reference number 605, in a pre-awareness state, the UEs 120 may exchange BSMs, SSMs, and/or the like. The UEs 120 in the pre-awareness state may operate in a similar manner as described above with respect to FIG. 5 (e.g., the BSMs and/or the SSMs may include similar information and may be exchanged in a similar manner).

As shown by reference number 610, the first UE 120 (e.g., of the host vehicle) may determine a set of one or more UEs 120 (e.g., a set of one or more remote vehicles, SetRV) for a proposed maneuver (e.g., a proposed maneuver to be performed by the host vehicle). During this time, the first UE 120 may be in a preparation state (e.g., a maneuver sharing and coordinating service (MSCS) preparation state). The maneuver message may indicate one or more target road resources associated with the proposed maneuver. The first UE 120 may determine the set of one or more UEs 120 in a similar manner as described above with respect to FIG. 5.

As shown by reference number 615, the first UE 120 may transmit a maneuver message that indicates the maneuver, one or more target road resources associated with the maneuver, and/or the relevant area each target road resource of the one or more target road resources. The first UE 120 may transmit the maneuver message in a similar manner as described above with respect to FIG. 5.

In some aspects, the first UE 120 may determine one or more remote vehicle maneuvers associated with the proposed maneuver. A remove vehicle maneuver may be a maneuver that is to be performed by a remote vehicle, such as a remote vehicle associated with a UE 120 included in the set of one or more UEs 120 for the proposed maneuver. A remote vehicle maneuver may indicate a target road resource associated with the remote vehicle maneuver. The remote vehicle maneuver may be based at least in part on the proposed maneuver and/or the target road resource of the proposed maneuver. For example, a remote vehicle maneuver may be a maneuver that a remote vehicle must perform to conform with the proposed maneuver (e.g., to avoid a collision and/or the like).

In some aspects, the maneuver message may indicate a target road resource field. The target road resource field may include information identifying a target road resource (such as the information described above with respect to FIG. 5) along with a vehicle identifier. The vehicle identifier may indicate if a target road resource is associated with the proposed maneuver (e.g., associated with the host vehicle and the first UE 120) or if the target road resource is associated with a remote vehicle maneuver (e.g., associated with a remote vehicle and another UE 120 (e.g., the second UE 120, the third UE 120, and/or the like). For example, the target road resource for the proposed maneuver may include a vehicle identifier associated with the host vehicle (e.g., the vehicle associated with the first UE 120). A target road resource for a remote vehicle maneuver associated with the vehicle associated with the second UE 120 may include a vehicle identifier associated with the vehicle associated with the second UE 120.

In some aspects, the maneuver message may indicate a host vehicle target road resource field and a remote vehicle target road resource field. In some aspects, the host vehicle target road resource field may include a vehicle identifier associated with the host vehicle. In some aspects, the host vehicle target road resource field may not include a vehicle identifier (e.g., one or more other UEs 120 may determine the target road resource identified in the host vehicle target road resource field is associated with the host vehicle based at least in part on the target road resource being identified in the host vehicle target road resource field). The remote vehicle target road resource field may indicate a vehicle identifier associated with a remote vehicle. For example, if a target road resource is associated with a maneuver for the vehicle associated with the second UE 120, the remote vehicle target road resource field may indicate the target road resource and a vehicle identifier associated with the vehicle associated with the second UE 120. Similarly, if a target road resource is associated with a maneuver for the vehicle associated with the third UE 120, the remote vehicle target road resource field may indicate the target road resource and a vehicle identifier associated with the vehicle associated with the third UE 120. In this way, the remote vehicle target road resource field may indicate one or more target road resources for one or more remote vehicle maneuvers.

In some aspects, the maneuver message may be an urgent maneuver message (e.g., associated with an urgent maneuver of the host vehicle). The urgent maneuver may be identified based at least in part on a message type field in the maneuver message. The urgent maneuver message may include a target road resource for the urgent maneuver (e.g., a host vehicle target road resource and/or the like). Additionally, the urgent maneuver message may include a target road resource for one or more remote vehicle maneuvers required for the host vehicle to complete the urgent maneuver. In some aspects, a UE 120 of a remote vehicle that receives the urgent maneuver message may associate the urgent maneuver and a remote maneuver associated with the UE 120 of the remote vehicle with a higher priority than other maneuvers based at least in part on the indication of the urgent maneuver.

As shown by reference number 620, the second UE 120 may receive the maneuver message. The second UE 120 may determine that the maneuver message indicates a remote vehicle maneuver for the vehicle associated with the second maneuver. For example, the second UE 120 may identify a target road resource field, a remote vehicle target road resource field, and/or the like in the maneuver message. The second UE 120 may identify a vehicle identifier associated with the vehicle associated with the second UE 120 in a target road resource indicated by the maneuver message (e.g., in the target road resource field, in the remote vehicle target road resource field, and/or the like). The second UE 120 may determine that the target road resource that indicates the vehicle identifier associated with the vehicle associated with the second UE 120 is for a remote vehicle maneuver for the vehicle associated with the second UE 120.

The second UE 120 may determine if the vehicle associated with the second UE 120 is capable of completing the remote vehicle maneuver indicated in the maneuver message. The second UE 120 may determine whether to accept or reject the maneuver message based at least in part on determining if the vehicle associated with the second UE 120 is capable of completing the remote vehicle maneuver indicated in the maneuver message. For example, if the second UE 120 determines that the vehicle of the second UE 120 cannot conform to the remote vehicle maneuver indicated in the maneuver message, the second UE 120 may reject the maneuver message. In some aspects, if the second UE 120 determines that the maneuver message is to be rejected, the second UE 120 may determine a suggested maneuver and/or a suggested target road resource (e.g., in a similar manner as described above with respect to FIG. 5).

In some aspects, if the second UE 120 determines that the maneuver message is to be rejected, the second UE 120 may determine a suggested remote vehicle maneuver associated with the vehicle associated with the second UE 120. For example, the second UE 120 may determine a suggest target road resource for a remote vehicle maneuver associated with the vehicle associated with the second UE 120 based at least in part on the target road resource for the remove vehicle maneuver indicated in the maneuver message. The second UE 120 may indicate the suggested remote vehicle maneuver in a similar manner as indicating the suggest maneuver (e.g., as described above with respect to FIG. 5).

As shown by reference number 625, the third UE 120 may receive the maneuver message. The third UE 120 may determine that the maneuver message indicates a remote vehicle maneuver for the vehicle associated with the third UE 120 in a similar manner as described above with respect to the second UE 120. The third UE 120 may determine if the vehicle associated with the third UE 120 is capable of conforming to the remote vehicle maneuver indicated in the maneuver message. The third UE 120 may determine whether to accept or reject the maneuver message based at least in part on determining if the vehicle associated with the third UE 120 is capable of completing the remote vehicle maneuver indicated in the maneuver message.

As shown by reference number 630, the second UE 120 may transmit, to the first UE 120, a reviewed maneuver message indicating an acceptance or a rejection of the maneuver message. The acceptance or the rejection of the maneuver message may be based at least in part on a determination of whether the vehicle associated with the second UE 120 is capable of completing the remote vehicle maneuver indicated in the maneuver message. In some aspects, the acceptance or the rejection of the maneuver message may be based at least in part on determining whether there is a risk of a collision between the vehicle associated with the second UE 120 and the vehicle associated with the first UE 120 (e.g., if the maneuver message does not include a remote vehicle maneuver associated with the vehicle associated with the second UE 120).

As shown by reference number 635, the third UE 120 may transmit, to the first UE 120, a reviewed maneuver message indicating an acceptance or a rejection of the maneuver message. The acceptance or the rejection of the maneuver message may be based at least in part on a determination of whether the vehicle associated with the third UE 120 is capable of completing the remote vehicle maneuver indicated in the maneuver message. In some aspects, the acceptance or the rejection of the maneuver message may be based at least in part on determining whether there is a risk of a collision between the vehicle associated with the third UE 120 and the vehicle associated with the first UE 120 (e.g., if the maneuver message does not include a remote vehicle maneuver associated with the vehicle associated with the third UE 120). In some aspects, a reviewed maneuver message indicating a rejection of the maneuver message may indicate a suggested maneuver, in a similar manner as described above in connection with FIG. 5.

The first UE 120 may receive one or more reviewed maneuver messages indicating an acceptance or a rejection of the maneuver message. The first UE 120 may determine if a grant condition associated with the proposed maneuver is satisfied based at least in part on receiving the one or more reviewed maneuver messages. For example, the first UE 120 may determine a grant condition has been satisfied if the first UE 120 has received a reviewed maneuver message indicating an acceptance of the maneuver message from each UE 120 included in the set of one or more UEs 120 for the proposed maneuver and the first UE 120 has not received a reviewed maneuver message indicating a rejection of the maneuver message from any other UE 120.

If the first UE 120 determines that the grant condition has not been satisfied, the first UE 120 may return to the pre-awareness state (e.g., exchanging BSMs and/or SSMs) or the preparation state (e.g., determining a new set of one or more UEs 120 for the proposed maneuver). In this way, the first UE 120 may enter a new negotiation for a new proposed maneuver if the initial maneuver has been rejected (e.g., the grant condition has not been satisfied). As a result, the negotiations for proposed maneuvers may be simplified, conserving time and/or processing resources that would have otherwise been used performing additional actions after determining that the initial maneuver has been rejected.

If the first UE 120 determines that the grant condition for the maneuver has been satisfied, the first UE 120 may transmit a granted maneuver message indicating the granted maneuver, the target road resource associated with the granted maneuver, and one or more target road resource associated with one or more remote vehicle maneuvers. The first UE 120 may transmit the granted maneuver message using a broadcast transmission.

In some aspects, if the first UE 120 does not receive any cancellation messages associated with the granted maneuver for a first period of time and does not transmit any cancellation messages associated with the granted maneuver for a second period of time, the first UE 120 may transition to a maneuver execution state. During the maneuver execution state, the first UE 120 may cause the host vehicle to move according to the granted maneuver (e.g., may cause the vehicle to move, may provide an indication to a diver of the host vehicle, and/or the like). For example, the first UE 120 may cause the host vehicle to perform the granted maneuver using a target road resource indicated in the granted maneuver message.

Similarly, during the maneuver execution state, the second UE 120 and/or the third UE 120 may cause a remote vehicle to move according to a remote vehicle maneuver indicated in the granted maneuver message (e.g., may cause the vehicle to move, may provide an indication to a diver of the host vehicle, and/or the like). For example, the second UE 120 may cause a vehicle associated with the second UE 120 to perform a remote vehicle maneuver using a remote vehicle target road resource indicated in the granted maneuver message.

As a result, the negotiation for a proposed maneuver between the first UE 120 and one or more other UEs 120 may be simplified as the first UE 120 may coordinate all maneuvers among the host vehicle and one or more remote vehicles. Therefore, the one or more other UEs 120 (e.g., the second UE 120 and/or the third UE 120) may not need to determine a maneuver for a remote vehicle that is associated with the proposed maneuver. Instead, the one or more other UEs 120 may only need to determine if a remote vehicle associated with the one or more other UEs 120 is capable of conforming to a remote vehicle maneuver indicated by the first UE 120. In this way, the first UE 120 may conserve resources that would have otherwise been used associated with multiple UEs 120 determining remote vehicle maneuvers associated with the proposed maneuver. Additionally, this may enable the first UE 120 to determine remote vehicle maneuvers for remote vehicles associated with UEs 120 that are not capable of determining remote vehicle maneuvers. Moreover, this may reduce latency associated with the negotiation procedure between the first UE 120 and the one or more other UEs 120 as the one or more other UEs 120 may not need to determine a maneuver for a remote vehicle that is associated with the proposed maneuver.

As indicated above, FIG. 6 is provided as an example. Other examples may differ from what is described with respect to FIG. 6.

Figure 7:
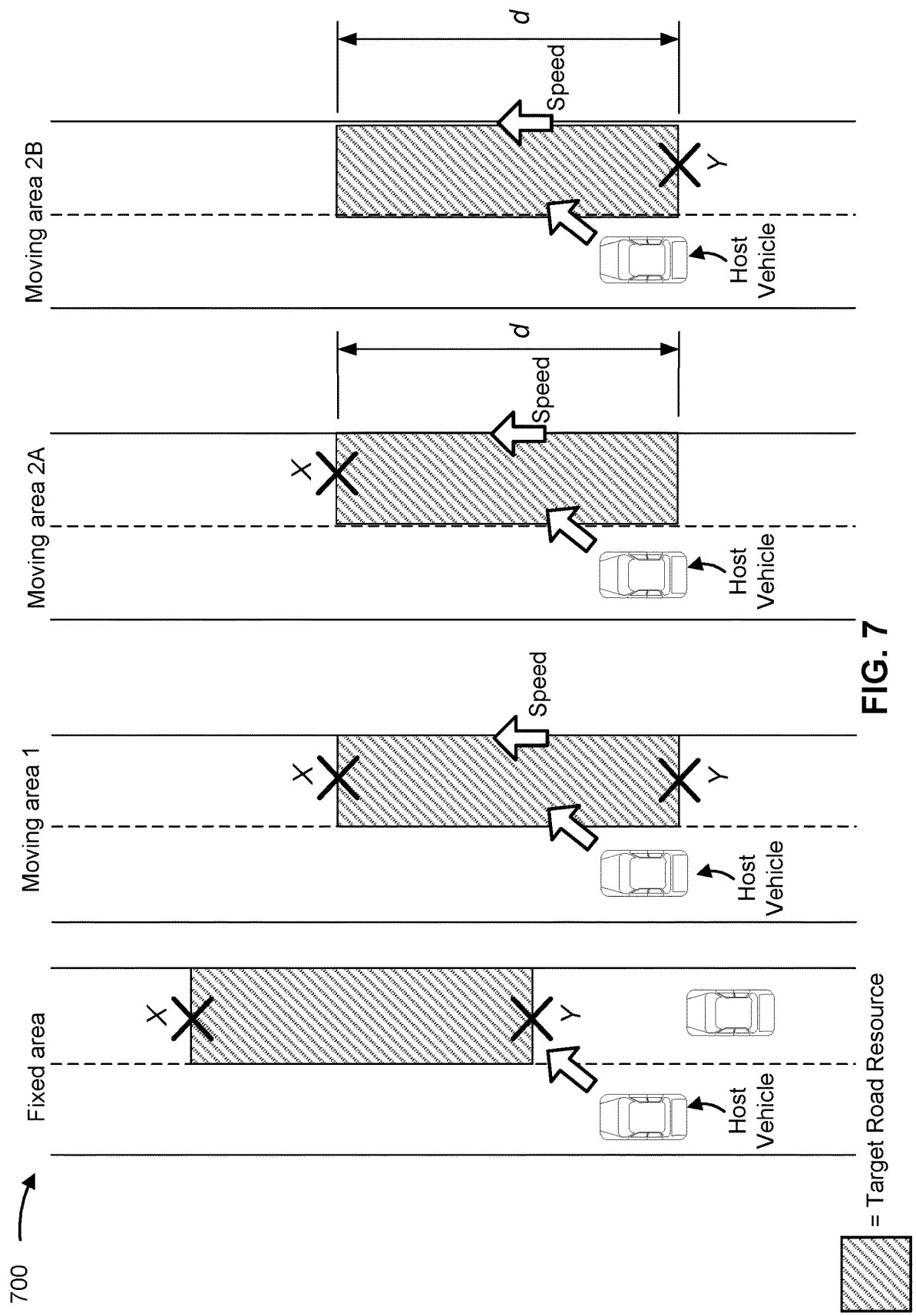

FIG. 7 is a diagram illustrating an example 700 associated with V2V maneuver sharing and coordinating, in accordance with the present disclosure. As shown in FIG. 7, example 700 includes a host vehicle (e.g., associated with a UE 120) and one or more moving vehicles traveling on a road.

The UE 120 of the host vehicle may initiate a maneuver (e.g., a movement on the road). For example, as shown in FIG. 7, the maneuver may be a lane change maneuver. The maneuver may be associated with a target road resource (e.g., an area of the road to be used for the maneuver). The UE 120 of the host vehicle may define the target road resource as a fixed area and/or as a moving area.

For example, as shown in FIG. 7, the UE 120 of the host vehicle may determine a rear location of the target road resource, Y (e.g., in latitude and longitude). The UE 120 may determine a front location of the target road resource, X (e.g., in latitude and longitude). In some aspects, the UE 120 may indicate a midpoint position of the target road resource and a distance from the midpoint position to the front location and the rear location of the target road resource. The UE 120 may determine a width of the target road resource. In some aspects, the width of the target road resource may correspond to a width of a lane of the road the host vehicle is traveling on.

In some aspects, the UE 120 of the host vehicle may define the target road resource as a moving area using dynamic information. For example, the UE 120 may determine that the target road resource is a moving area between two positions (e.g., moving area 1), after a position (e.g., moving area 2A), or before a position (e.g., moving area 2B).

The UE 120 may define the target road resource in moving area 1 by defining the dynamic front location, X, (e.g., in latitude and longitude) at a first time. The first time may be an initial time, an anchor time, an earliest time associated with the target road resource, a time at which the target road resource is determined, and/or the like. Similarly, the UE 120 may define the dynamic rear location, Y, (e.g., in latitude and longitude) at the first time. The UE 120 may determine a speed associated with the target road resource (e.g., a speed at which the target road resource is moving on the road). The speed associated with the target road resource may be based at least in part on a speed of the host vehicle, a speed of the host vehicle when executing a maneuver associated with the target road resource, and/or the like. The UE 120 may provide, to one or more other UEs 120, an indication of the position of the dynamic front location at the first time, an indication of the position of the dynamic rear location at the first time, and an indication of the speed associated with the target road resource. By providing an indication of the positions of the dynamic front location and the dynamic rear location and the speed associated with the target road resource, the one or more other UEs 120 may determine a location of the moving target road resource at a time after the first time based at least in part on the speed associated with the target road resource.

The UE 120 may define the target road resource in moving area 2A by defining a dynamic location, X, (e.g., in latitude and longitude) at a first time. The UE 120 may define the target road resource in moving area 2A by providing an indication that the dynamic location is to be used to define the front location of the target road resource. The UE 120 may define the dynamic rear location of the target road resource using a distance identifier (e.g., d as shown in FIG. 7) indicating a distance from the position of the dynamic location X to the rear location of the target road resource. The UE 120 may provide, to one or more other UEs 120, an indication of the position of the dynamic location at the first time, an indication of the distance from the dynamic location to the opposite end of the target road resource, and an indication of the speed associated with the target road resource.

The UE 120 may define the target road resource in moving area 2B by defining a dynamic location, Y, (e.g., in latitude and longitude) at a first time. The UE 120 may define the target road resource in moving area 2B by providing an indication that the dynamic location is to be used to define the rear location of the target road resource. The UE 120 may define the dynamic front location of the target road resource using a distance identifier indicating a distance from the position of the dynamic location Y to the front location of the target road resource (e.g., d as shown in FIG. 7). The UE 120 may provide, to one or more other UEs 120, an indication of the position of the dynamic location at the first time, an indication of the distance from the dynamic location to the opposite end of the target road resource, and an indication of the speed associated with the target road resource.

In some aspects, the dynamic location (e.g., of moving areas 2A or 2B) may be a midpoint location. In that case, the UE 120 may define the dynamic front location of the target road resource and the dynamic rear location of the target road resource using a distance identifier indicating a distance from the midpoint location to each end of the target road resource.

As described above with respect to FIGS. 5 and 6, the UE 120 may define the target road resource using temporal information (e.g., an earliest time associated with the target road resource and/or a latest time associated with the target road resource), size information (e.g., length, width, height, radius, and/or the like), location information, (e.g., latitude, longitude, elevation, and/or the like), and/or motion information (e.g., a heading, a speed, an acceleration, and/or the like). The UE 120 may indicate the information described herein in a maneuver message that is transmitted or broadcast to one or more other UEs 120.

As indicated above, FIG. 7 is provided as an example. Other examples may differ from what is described with respect to FIG. 7.

Figure 8:
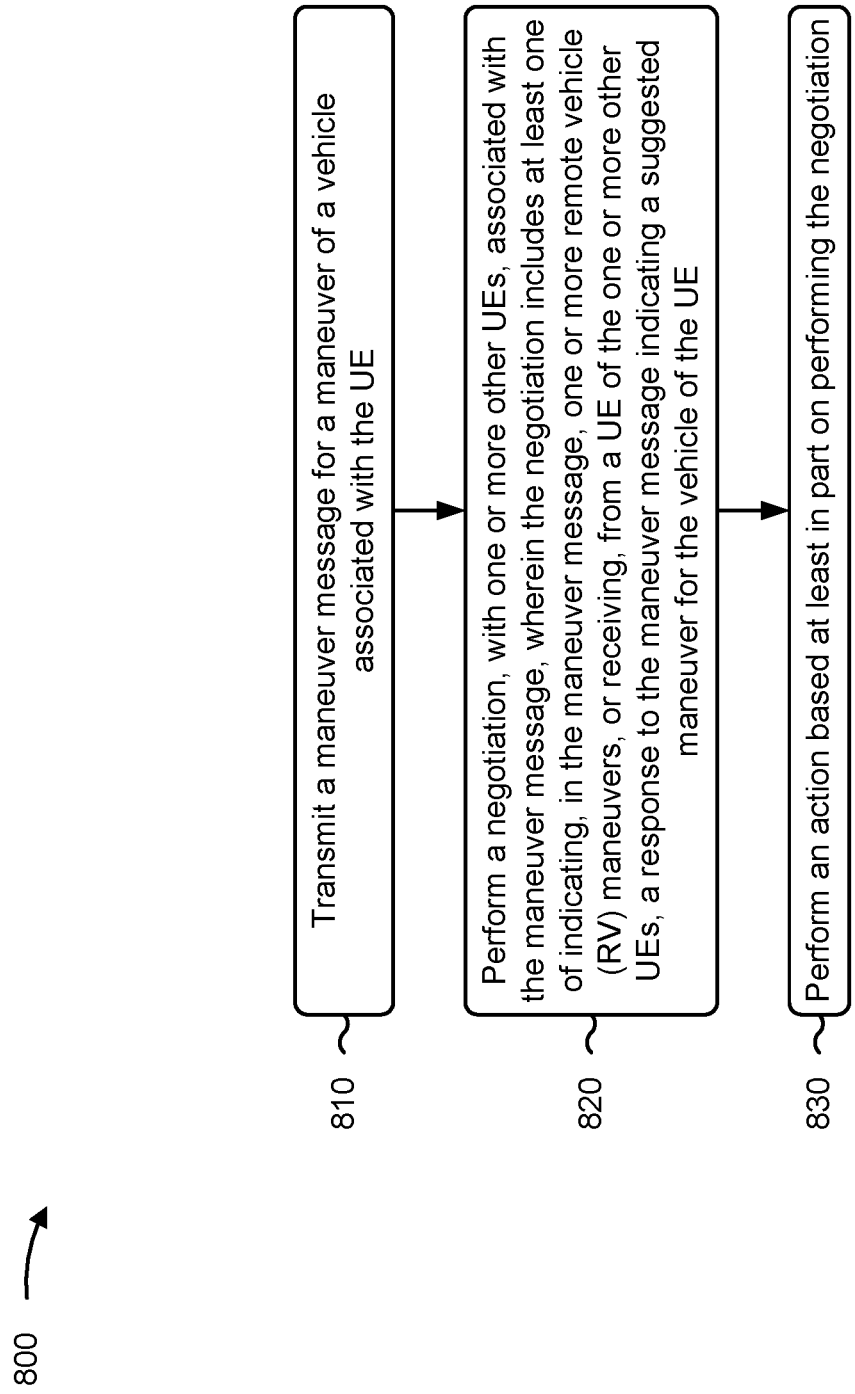
FIGS. 8-9 are diagrams illustrating example processes associated with V2V maneuver sharing and coordinating, in accordance with the present disclosure.

FIG. 8 is a diagram illustrating an example process 800 performed, for example, by a UE, in accordance with the present disclosure. Example process 800 is an example where the UE (e.g., a UE 120 depicted in, or described in connection with, FIGS. 1-7) performs operations associated with V2V maneuver sharing and coordinating.

As shown in FIG. 8, in some aspects, process 800 may include transmitting a maneuver message for a maneuver of a vehicle associated with the UE (block 810). For example, the UE (e.g., using receive processor 258, transmit processor 264, controller/processor 280, memory 282, and/or the like) may transmit a maneuver message for a maneuver of a vehicle associated with the UE, as described above.

As further shown in FIG. 8, in some aspects, process 800 may include performing a negotiation, with one or more other UEs, associated with the maneuver message, wherein the negotiation includes at least one of: indicating, in the maneuver message, one or more RV maneuvers, or receiving, from a UE of the one or more other UEs, a response to the maneuver message indicating a suggested maneuver for the vehicle of the UE (block 820). For example, the UE (e.g., using receive processor 258, transmit processor 264, controller/processor 280, memory 282, and/or the like) may perform a negotiation, with one or more other UEs, associated with the maneuver message, as described above. In some aspects, the negotiation includes at least one of indicating, in the maneuver message, one or more RV maneuvers, or receiving, from a UE of the one or more other UEs, a response to the maneuver message indicating a suggested maneuver for the vehicle of the UE.

As further shown in FIG. 8, in some aspects, process 800 may include performing an action based at least in part on performing the negotiation (block 830). For example, the UE (e.g., using receive processor 258, transmit processor 264, controller/processor 280, memory 282, and/or the like) may perform an action based at least in part on performing the negotiation, as described above.

Process 800 may include additional aspects, such as any single aspect or any combination of aspects described below and/or in connection with one or more other processes described elsewhere herein.

In a first aspect, the vehicle is a host vehicle and the one or more other UEs are associated with one or more remote vehicles.

In a second aspect, alone or in combination with the first aspect, the response indicating the suggested maneuver for the vehicle of the UE indicates a rejection of the maneuver, and the suggested maneuver is based at least in part on a target road resource for the maneuver.

In a third aspect, alone or in combination with one or more of the first and second aspects, the response indicating the suggested maneuver for the vehicle of the UE identifies a suggested road resource for the suggested maneuver.

In a fourth aspect, alone or in combination with one or more of the first through third aspects, the suggested road resource has a same format as the target road resource for the maneuver.

In a fifth aspect, alone or in combination with one or more of the first through fourth aspects, the suggested road resource identifies information associated with the suggested road resource that is different than information associated with the target road resource.

In a sixth aspect, alone or in combination with one or more of the first through fifth aspects, process 800 includes transmitting a second maneuver message for a second maneuver of the vehicle associated with the UE, wherein the second maneuver message identifies a second target road resource, and wherein the second target road resource is based at least in part on the suggested road resource for the suggested maneuver.

In a seventh aspect, alone or in combination with one or more of the first through sixth aspects, the one or more RV maneuvers are associated with one or more vehicles associated with the one or more other UEs, and the one or more RV maneuvers are based at least in part on the maneuver of the vehicle associated with the UE.

In an eighth aspect, alone or in combination with one or more of the first through seventh aspects, performing the negotiation, with the one or more other UEs, associated with the maneuver message comprises receiving, from a UE of the one or more other UEs, a response to the maneuver message indicating an acceptance of the maneuver or a rejection of the maneuver based at least in part on a determination of whether a vehicle associated with the UE of the one or more other UEs can perform an RV maneuver of the one or more RV maneuvers indicated in the maneuver message.

In a ninth aspect, alone or in combination with one or more of the first through eighth aspects, the maneuver message for the maneuver of the vehicle associated with the UE identifies one or more target road resources including one or more target road resources for the maneuver of the vehicle associated with the UE and one or more target road resources for the one or more RV maneuvers.

In a tenth aspect, alone or in combination with one or more of the first through ninth aspects, the one or more target road resources for the maneuver of the vehicle associated with the UE include a vehicle identifier associated with the vehicle associated with the UE.

In an eleventh aspect, alone or in combination with one or more of the first through tenth aspects, a target road resource of the one or more target road resources for the one or more RV maneuvers is identified by a vehicle identifier associated with a vehicle of the one or more vehicles associated with the one or more other UEs.

In a twelfth aspect, alone or in combination with one or more of the first through eleventh aspects, the maneuver message for the maneuver of the vehicle associated with the UE identifies one or more target road resources for the maneuver of the vehicle associated with the UE, and one or more RV target road resources for the one or more RV maneuvers.

In a thirteenth aspect, alone or in combination with one or more of the first through twelfth aspects, the maneuver message is an urgent maneuver message.

In a fourteenth aspect, alone or in combination with one or more of the first through thirteenth aspects, the maneuver message indicates the one or more RV maneuvers, and performing the negotiation, with the one or more other UEs, associated with the maneuver message, comprises receiving a response to the maneuver message, wherein the response indicates a rejection of a least one of the maneuver or an RV maneuver of the one or more RV maneuvers, and the suggested maneuver for the vehicle associated with the UE based at least in part on a target road resource for the maneuver.

In a fifteenth aspect, alone or in combination with one or more of the first through fourteenth aspects, performing the negotiation, with one or more other UEs, associated with the maneuver message comprises receiving a response, from a UE of the one or more other UEs, to the maneuver message, wherein the response indicates a rejection of the maneuver and a suggested RV maneuver for a vehicle associated with the UE of the one or more other UEs, and the suggested RV maneuver for the vehicle associated with the UE of the one or more other UEs is based at least in part on the one or more RV maneuvers indicated in the maneuver message.

In a sixteenth aspect, alone or in combination with one or more of the first through fifteenth aspects, performing the action comprises determining that the maneuver has been granted based at least in part on performing the negotiation, wherein one or more responses to the maneuver message indicate an acceptance of the maneuver, and transmitting, to the one or more other UEs, a granted maneuver message identifying a target road resource for the maneuver.

In a seventeenth aspect, alone or in combination with one or more of the first through sixteenth aspects, the granted maneuver message identifies the target road resource for the maneuver and one or more target road resources for the one or more RV maneuvers.

In an eighteenth aspect, alone or in combination with one or more of the first through seventeenth aspects, the maneuver message identifies one or more target road resources for the maneuver, and process 800 includes determining, for a target road resource of the one or more target road resources, dynamic location information associated with the target road resource.

In a nineteenth aspect, alone or in combination with one or more of the first through eighteenth aspects, determining the dynamic location information associated with the target road resource comprises determining a dynamic front location of the target road resource, determining a dynamic rear location of the target road resource, and determining a speed associated with the target road resource.

In a twentieth aspect, alone or in combination with one or more of the first through nineteenth aspects, the dynamic location information is identified in the maneuver message using at least one of a position of the dynamic front location of the target road resource at a first time, a position of the dynamic rear location of the target road resource at the first time, or an indication of the speed associated with the target road resource.

In a twenty-first aspect, alone or in combination with one or more of the first through twentieth aspects, determining the dynamic location information associated with the target road resource comprises determining a dynamic location of the target road resource, wherein the dynamic location of the target road resource is a dynamic front location or a dynamic rear location, and determining a speed associated with the target road resource.

In a twenty-second aspect, alone or in combination with one or more of the first through twenty-first aspects, the dynamic location information is identified in the maneuver message using at least one of: an identifier indicating that the dynamic location of the target road resource is associated with the dynamic front location or the dynamic rear location, a position of the dynamic location of the target road resource at a first time, a distance identifier indicating a distance from the position of the dynamic location to the opposite end of the target road resource, or an indication of the speed associated with the target road resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
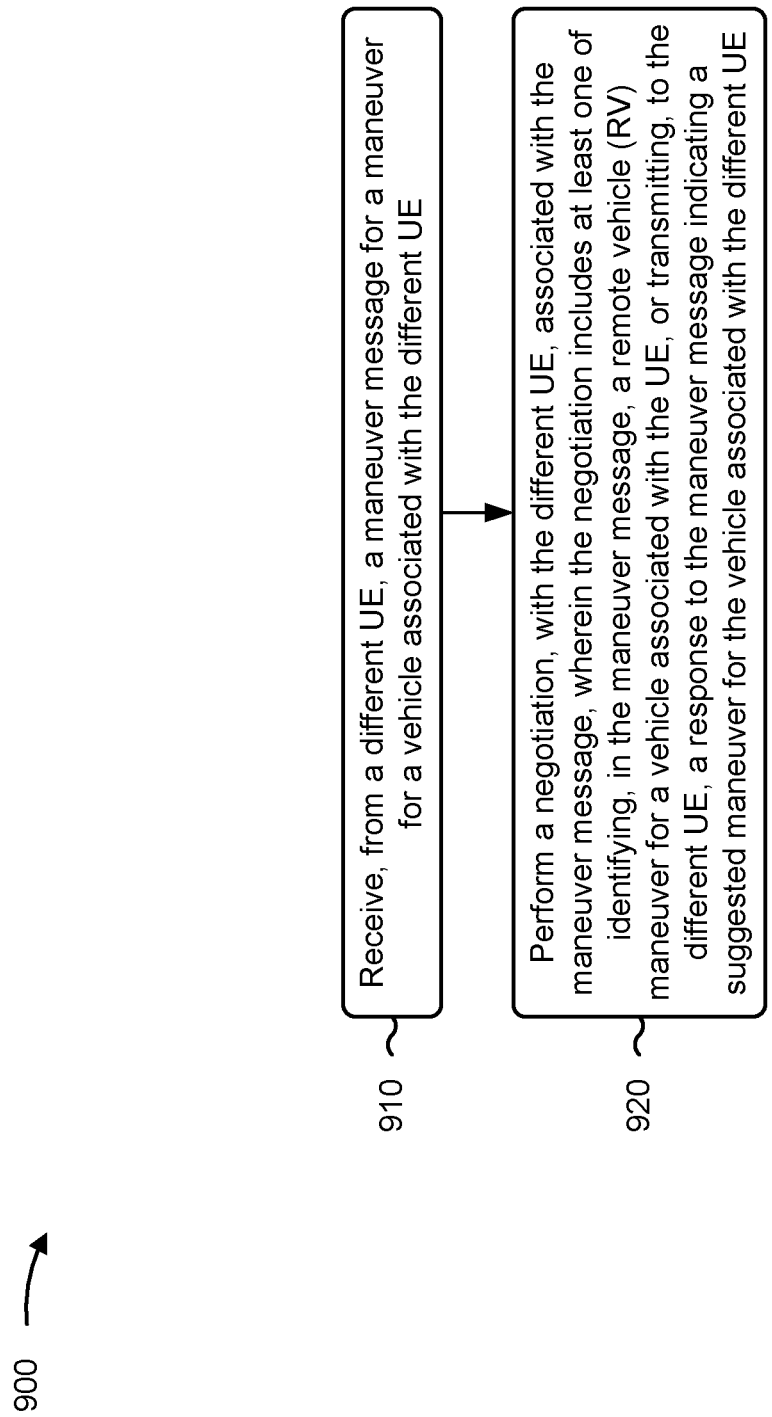

FIG. 9 is a diagram illustrating an example process 900 performed, for example, by a UE, in accordance with the present disclosure. Example process 900 is an example where the UE (e.g., a UE 120 depicted in, or described in connection with, FIGS. 1-7) performs operations associated with V2V maneuver sharing and coordinating.

As shown in FIG. 9, in some aspects, process 900 may include receiving, from a different UE, a maneuver message for a maneuver for a vehicle associated with the different UE (block 910). For example, the UE (e.g., using receive processor 258, transmit processor 264, controller/processor 280, memory 282, and/or the like) may receive, from a different UE, a maneuver message for a maneuver for a vehicle associated with the different UE, as described above.

As further shown in FIG. 9, in some aspects, process 900 may include performing a negotiation, with the different UE, associated with the maneuver message, wherein the negotiation includes at least one of: identifying, in the maneuver message, an RV maneuver for a vehicle associated with the UE, or transmitting, to the different UE, a response to the maneuver message indicating a suggested maneuver for the vehicle associated with the different UE (block 920). For example, the UE (e.g., using receive processor 258, transmit processor 264, controller/processor 280, memory 282, and/or the like) may perform a negotiation, with the different UE, associated with the maneuver message, as described above. In some aspects, the negotiation includes at least one of identifying, in the maneuver message, an RV maneuver for a vehicle associated with the UE, or transmitting, to the different UE, a response to the maneuver message indicating a suggested maneuver for the vehicle associated with the different UE.

Process 900 may include additional aspects, such as any single aspect or any combination of aspects described below and/or in connection with one or more other processes described elsewhere herein.

In a first aspect, the vehicle associated with the UE is an RV and the vehicle associated with the different UE is a host vehicle.

In a second aspect, alone or in combination with the first aspect, performing the negotiation comprises determining the suggested maneuver for the vehicle associated with the different UE based at least in part on a target road resource for the maneuver, and transmitting, to the different UE, the response to the maneuver message indicating a rejection of the maneuver and the suggested maneuver for the vehicle associated with the different UE.

In a third aspect, alone or in combination with one or more of the first and second aspects, determining the suggested maneuver for the vehicle associated with the different UE comprises determining a suggested road resource for the suggested maneuver based at least in part on the target road resource for the maneuver, and the response to the maneuver message indicating the suggested maneuver identifies the suggested road resource for the suggested maneuver.

In a fourth aspect, alone or in combination with one or more of the first through third aspects, the suggested road resource has a same format as the target road resource for the maneuver.

In a fifth aspect, alone or in combination with one or more of the first through fourth aspects, the suggested road resource identifies information associated with the suggested road resource that is different than information associated with the target road resource.

In a sixth aspect, alone or in combination with one or more of the first through fifth aspects, process 900 includes receiving a second maneuver message for a second maneuver of the vehicle associated with the different UE, wherein the second maneuver message identifies a second target road resource, and wherein the second target road resource is based at least in part on the suggested road resource for the suggested maneuver.

In a seventh aspect, alone or in combination with one or more of the first through sixth aspects, the RV maneuver for the vehicle associated with the UE is based at least in part on the maneuver of the vehicle associated with the different UE.

In an eighth aspect, alone or in combination with one or more of the first through seventh aspects, performing the negotiation comprises determining whether the vehicle associated with the UE can perform the RV maneuver identified in the maneuver message, and transmitting, to the different UE, a response to the maneuver message indicating an acceptance of the maneuver or a rejection of the maneuver based at least in part on determining whether the vehicle associated with the UE can perform the RV maneuver identified in the maneuver message.

In a ninth aspect, alone or in combination with one or more of the first through eighth aspects, the maneuver message for the maneuver of the vehicle associated with the different UE identifies one or more target road resources including one or more target road resources for the maneuver of the vehicle associated with the different UE, and one or more target road resources for one or more RV maneuvers.

In a tenth aspect, alone or in combination with one or more of the first through ninth aspects, process 900 includes identifying the one or more target road resources for the maneuver of the vehicle associated with the different UE based at least in part on a vehicle identifier associated with the vehicle associated with the different UE included in the one or more target road resources for the maneuver of the vehicle associated with the different UE.

In an eleventh aspect, alone or in combination with one or more of the first through tenth aspects, process 900 includes identifying a target road resource of the one or more target road resources for the one or more RV maneuvers for the vehicle associated with the UE based at least in part on a vehicle identifier associated with the vehicle associated with the UE included in the target road resource of the one or more target road resources for the one or more RV maneuvers.

In a twelfth aspect, alone or in combination with one or more of the first through eleventh aspects, the maneuver message for the maneuver of the vehicle associated with the different UE identifies one or more target road resources for the maneuver of the vehicle associated with the different UE, and one or more RV target road resources for one or more RV maneuvers.

In a thirteenth aspect, alone or in combination with one or more of the first through twelfth aspects, the maneuver message is an urgent maneuver message.

In a fourteenth aspect, alone or in combination with one or more of the first through thirteenth aspects, the maneuver message identifies the RV maneuver for the vehicle associated with the UE, and performing the negotiation comprises determining to reject at least one of the maneuver or the RV maneuver; determining the suggested maneuver for the vehicle associated with the different UE based at least in part on a target road resource for the maneuver; and transmitting the response, to the different UE, to the maneuver message indicating a rejection of the maneuver and the suggested maneuver for the vehicle associated with the different UE based at least in part on determining the suggested maneuver for the vehicle associated with the different UE.

In a fifteenth aspect, alone or in combination with one or more of the first through fourteenth aspects, the maneuver message identifies the RV maneuver for the vehicle associated with the UE, and performing the negotiation comprises determining to reject at least one of the maneuver or the RV maneuver; determining a different RV maneuver for the vehicle associated with the UE based at least in part on the RV maneuver identified in the maneuver message; and transmitting a response, to the different UE, to the maneuver message indicating a rejection of the maneuver and the different RV maneuver for the vehicle associated with the UE based at least in part on determining the different RV maneuver for the vehicle associated with the UE.

In a sixteenth aspect, alone or in combination with one or more of the first through fifteenth aspects, process 900 includes receiving, from the different UE, a granted maneuver message identifying a target road resource for the maneuver.

In a seventeenth aspect, alone or in combination with one or more of the first through sixteenth aspects, the granted maneuver message identifies the target road resource for the maneuver and a target road resource for the RV maneuver for the vehicle associated with the UE.

In an eighteenth aspect, alone or in combination with one or more of the first through seventeenth aspects, the maneuver message identifies one or more target road resources for the maneuver, and a target road resource of the one or more target road resources indicates dynamic location information associated with the target road resource.

In a nineteenth aspect, alone or in combination with one or more of the first through eighteenth aspects, the dynamic location information associated with the target road resource indicates: a dynamic front location of the target road resource, a dynamic rear location of the target road resource, and a speed associated with the target road resource.

In a twentieth aspect, alone or in combination with one or more of the first through nineteenth aspects, the dynamic location information is identified in the maneuver message using at least one of a position of the dynamic front location of the target road resource at a first time, a position of the dynamic rear location of the target road resource at the first time, or an indication of the speed associated with the target road resource.

In a twenty-first aspect, alone or in combination with one or more of the first through twentieth aspects, the dynamic location information associated with the target road resource indicates a dynamic location of the target road resource, wherein the dynamic location of the target road resource is a dynamic front location or a dynamic rear location, and a speed associated with the target road resource.

In a twenty-second aspect, alone or in combination with one or more of the first through twenty-first aspects, the dynamic location information is identified in the maneuver message using at least one of: an identifier indicating that the dynamic location of the target road resource is associated with the dynamic front location or the dynamic rear location, a position of the dynamic location of the target road resource at a first time, a distance identifier indicating a distance from the position of the dynamic location to the opposite end of the target road resource, or an indication of the speed associated with the target road resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
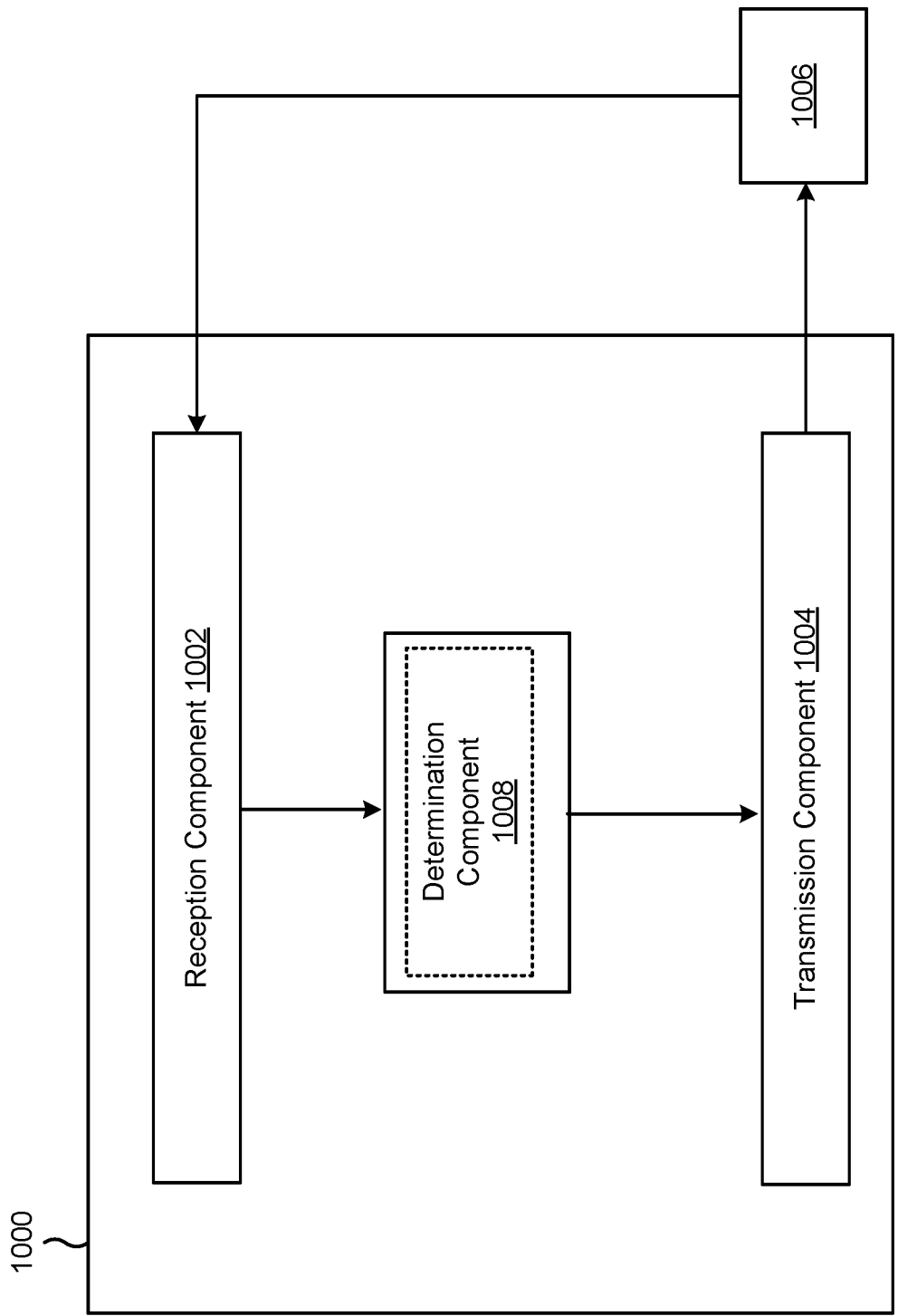
FIG. 10 is a block diagram of an example apparatus for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-7. Additionally or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the user equipment described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the user equipment described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the user equipment described above in connection with FIG. 2. In some aspects, the transmission component 1004 may be co-located with the reception component 1002 in a transceiver.

The reception component 1002 may receive, from one or more other UEs, one or more responses to a maneuver message, wherein the one or more responses to the maneuver message indicate an acceptance of the maneuver or a rejection of the maneuver, may receive, from a different UE, a maneuver message for a maneuver for a vehicle associated with the different UE, and/or the like. The determination component 1008 may determine an action to be performed based at least in part on performing, with one or more different UEs, a negotiation associated with a maneuver message, may determine whether to accept or reject a maneuver for a vehicle associated with a different UE, may determine a suggested maneuver for a vehicle associated with a different UE based at least in part on a target road resource for a maneuver of the vehicle, and/or the like. The transmission component 1004 may transmit a maneuver message for a maneuver of a vehicle associated with the UE, may transmit to a different UE, a response to a maneuver message indicating an acceptance or a rejection of the maneuver based at least in part on a determination of whether to accept or reject the maneuver for the vehicle associated with the different UE, and/or the like.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting a maneuver message for a maneuver of a vehicle associated with the UE; performing a negotiation, with one or more other UEs, associated with the maneuver message, wherein the negotiation includes at least one of: indicating, in the maneuver message, one or more remote vehicle (RV) maneuvers, or receiving, from a UE of the one or more other UEs, a response to the maneuver message indicating a suggested maneuver for the vehicle of the UE; and performing an action based at least in part on performing the negotiation.

Aspect 2: The method of Aspect 1, wherein the vehicle is a host vehicle and the one or more other UEs are associated with one or more remote vehicles.

Aspect 3: The method of any of Aspects 1-2, wherein the response indicating the suggested maneuver for the vehicle of the UE indicates a rejection of the maneuver, and wherein the suggested maneuver is based at least in part on a target road resource for the maneuver.

Aspect 4: The method of Aspect 3, wherein the response indicating the suggested maneuver for the vehicle of the UE identifies a suggested road resource for the suggested maneuver.

Aspect 5: The method of Aspect 4, wherein the suggested road resource for the suggested maneuver has a same format as the target road resource for the maneuver.

Aspect 6: The method of any of Aspects 4-5, wherein the suggested road resource identifies information associated with the suggested road resource that is different than information associated with the target road resource.

Aspect 7: The method of any of Aspects 4-6, further comprising: transmitting a second maneuver message for a second maneuver of the vehicle associated with the UE, wherein the second maneuver message identifies a second target road resource, and wherein the second target road resource is based at least in part on the suggested road resource for the suggested maneuver.

Aspect 8: The method of any of Aspects 1-7, wherein the one or more RV maneuvers are associated with one or more vehicles associated with the one or more other UEs, and wherein the one or more RV maneuvers are based at least in part on the maneuver of the vehicle associated with the UE.

Aspect 9: The method of Aspect 8, wherein performing the negotiation, with the one or more other UEs, associated with the maneuver message comprises: receiving, from a UE of the one or more other UEs, a response to the maneuver message indicating an acceptance of the maneuver or a rejection of the maneuver based at least in part on a determination of whether a vehicle associated with the UE of the one or more other UEs can perform an RV maneuver of the one or more RV maneuvers indicated in the maneuver message.

Aspect 10: The method of any of Aspects 1-9, wherein the maneuver message for the maneuver of the vehicle associated with the UE identifies one or more target road resources including: one or more target road resources for the maneuver of the vehicle associated with the UE; and one or more target road resources for the one or more RV maneuvers.

Aspect 11: The method of Aspect 10, wherein the one or more target road resources for the maneuver of the vehicle associated with the UE include a vehicle identifier associated with the vehicle associated with the UE.

Aspect 12: The method of any of Aspects 10-11, wherein a target road resource of the one or more target road resources for the one or more RV maneuvers is identified by a vehicle identifier associated with a vehicle of the one or more vehicles associated with the one or more other UEs.

Aspect 13: The method of any of Aspects 1-12, wherein the maneuver message for the maneuver of the vehicle associated with the UE identifies: one or more target road resources for the maneuver of the vehicle associated with the UE; and one or more RV target road resources for the one or more RV maneuvers.

Aspect 14: The method of any of Aspects 1-13, wherein the maneuver message is an urgent maneuver message.

Aspect 15: The method of any of Aspects 1-14, wherein the maneuver message indicates the one or more RV maneuvers, and wherein performing the negotiation, with the one or more other UEs, associated with the maneuver message comprises: receiving a response to the maneuver message, wherein the response indicates: a rejection of a least one of the maneuver or an RV maneuver of the one or more RV maneuvers, and the suggested maneuver for the vehicle associated with the UE based at least in part on a target road resource for the maneuver.

Aspect 16: The method of any of Aspects 1-15, wherein performing the negotiation, with one or more other UEs, associated with the maneuver message comprises: receiving a response, from a UE of the one or more other UEs, to the maneuver message, wherein the response indicates a rejection of the maneuver and a suggested RV maneuver for a vehicle associated with the UE of the one or more other UEs, and wherein the suggested RV maneuver for the vehicle associated with the UE of the one or more other UEs is based at least in part on the one or more RV maneuvers indicated in the maneuver message.

Aspect 17: The method of any of Aspects 1-16, wherein performing the action comprises: determining that the maneuver has been granted based at least in part on performing the negotiation, wherein one or more responses to the maneuver message indicate an acceptance of the maneuver; and transmitting, to the one or more other UEs, a granted maneuver message identifying a target road resource for the maneuver.

Aspect 18: The method of Aspect 17, wherein the granted maneuver message identifies the target road resource for the maneuver and one or more target road resources for the one or more RV maneuvers.

Aspect 19: The method of any of Aspects 1-18, wherein the maneuver message identifies one or more target road resources for the maneuver, the method further comprising: determining, for a target road resource of the one or more target road resources, dynamic location information associated with the target road resource.

Aspect 20: The method of Aspect 19, wherein determining the dynamic location information associated with the target road resource comprises: determining a dynamic front location of the target road resource; determining a dynamic rear location of the target road resource; and determining a speed associated with the target road resource.

Aspect 21: The method of Aspect 20, wherein the dynamic location information is identified in the maneuver message using at least one of: a position of the dynamic front location of the target road resource at a first time, a position of the dynamic rear location of the target road resource at the first time, or an indication of the speed associated with the target road resource.

Aspect 22: The method of any of Aspects 19-21, wherein determining the dynamic location information associated with the target road resource comprises: determining a dynamic location of the target road resource, wherein the dynamic location of the target road resource is a dynamic front location or a dynamic rear location; and determining a speed associated with the target road resource.

Aspect 23: The method of Aspect 22, wherein the dynamic location information is identified in the maneuver message using at least one of: an identifier indicating that the dynamic location of the target road resource is associated with the dynamic front location or the dynamic rear location, a position of the dynamic location of the target road resource at a first time, a distance identifier indicating a distance from the position of the dynamic location to the opposite end of the target road resource, or an indication of the speed associated with the target road resource.

Aspect 24: A method of wireless communication performed by a user equipment (UE), comprising: receiving, from a different UE, a maneuver message for a maneuver for a vehicle associated with the different UE; and performing a negotiation, with the different UE, associated with the maneuver message, wherein the negotiation includes at least one of: identifying, in the maneuver message, a remote vehicle (RV) maneuver for a vehicle associated with the UE, or transmitting, to the different UE, a response to the maneuver message indicating a suggested maneuver for the vehicle associated with the different UE.

Aspect 25: The method of Aspect 24, wherein the vehicle associated with the UE is an RV and the vehicle associated with the different UE is a host vehicle.

Aspect 26: The method of any of Aspects 24-25, wherein performing the negotiation comprises: determining the suggested maneuver for the vehicle associated with the different UE based at least in part on a target road resource for the maneuver; and transmitting, to the different UE, the response to the maneuver message indicating a rejection of the maneuver and the suggested maneuver for the vehicle associated with the different UE.

Aspect 27: The method of Aspect 26, wherein determining the suggested maneuver for the vehicle associated with the different UE comprises determining a suggested road resource for the suggested maneuver based at least in part on the target road resource for the maneuver, and wherein the response to the maneuver message indicating the suggested maneuver identifies the suggested road resource for the suggested maneuver.

Aspect 28: The method of Aspect 27, wherein the suggested road for the suggested maneuver resource has a same format as the target road resource for the maneuver.

Aspect 29: The method of any of Aspects 27-28, wherein the suggested road resource identifies information associated with the suggested road resource that is different than information associated with the target road resource.

Aspect 30: The method of any of Aspects 27-29, further comprising: receiving a second maneuver message for a second maneuver of the vehicle associated with the different UE, wherein the second maneuver message identifies a second target road resource, and wherein the second target road resource is based at least in part on the suggested road resource for the suggested maneuver.

Aspect 31: The method of any of Aspects 24-30, wherein the RV maneuver for the vehicle associated with the UE is based at least in part on the maneuver of the vehicle associated with the different UE.

Aspect 32: The method of Aspect 31, wherein performing the negotiation comprises: determining whether the vehicle associated with the UE can perform the RV maneuver identified in the maneuver message; and transmitting, to the different UE, a response to the maneuver message indicating an acceptance of the maneuver or a rejection of the maneuver based at least in part on determining whether the vehicle associated with the UE can perform the RV maneuver identified in the maneuver message.

Aspect 33: The method of any of Aspects 24-32, wherein the maneuver message for the maneuver of the vehicle associated with the different UE identifies one or more target road resources including: one or more target road resources for the maneuver of the vehicle associated with the different UE; and one or more target road resources for one or more RV maneuvers.

Aspect 34: The method of Aspect 33, further comprising: identifying the one or more target road resources for the maneuver of the vehicle associated with the different UE based at least in part on a vehicle identifier associated with the vehicle associated with the different UE included in the one or more target road resources for the maneuver of the vehicle associated with the different UE.

Aspect 35: The method of any of Aspects 33-34, further comprising: identifying a target road resource of the one or more target road resources for the one or more RV maneuvers for the vehicle associated with the UE based at least in part on a vehicle identifier associated with the vehicle associated with the UE included in the target road resource of the one or more target road resources for the one or more RV maneuvers.

Aspect 36: The method of any of Aspects 24-35, wherein the maneuver message for the maneuver of the vehicle associated with the different UE identifies: one or more target road resources for the maneuver of the vehicle associated with the different UE; and one or more RV target road resources for one or more RV maneuvers.

Aspect 37: The method of any of Aspects 24-36, wherein the maneuver message is an urgent maneuver message.

Aspect 38: The method of any of Aspects 24-37, wherein the maneuver message identifies the RV maneuver for the vehicle associated with the UE, and wherein performing the negotiation comprises: determining to reject at least one of the maneuver or the RV maneuver; determining the suggested maneuver for the vehicle associated with the different UE based at least in part on a target road resource for the maneuver; and transmitting the response, to the different UE, to the maneuver message indicating a rejection of the maneuver and the suggested maneuver for the vehicle associated with the different UE based at least in part on determining the suggested maneuver for the vehicle associated with the different UE.

Aspect 39: The method of any of Aspects 24-38, wherein the maneuver message identifies the RV maneuver for the vehicle associated with the UE, and wherein performing the negotiation comprises: determining to reject at least one of the maneuver or the RV maneuver; determining a different RV maneuver for the vehicle associated with the UE based at least in part on the RV maneuver identified in the maneuver message; and transmitting a response, to the different UE, to the maneuver message indicating a rejection of the maneuver and the different RV maneuver for the vehicle associated with the UE based at least in part on determining the different RV maneuver for the vehicle associated with the UE.

Aspect 40: The method of any of Aspects 24-39, further comprising: receiving, from the different UE, a granted maneuver message identifying a target road resource for the maneuver.

Aspect 41: The method of Aspect 40, wherein the granted maneuver message identifies the target road resource for the maneuver and a target road resource for the RV maneuver for the vehicle associated with the UE.

Aspect 42: The method of any of Aspects 24-41, wherein the maneuver message identifies one or more target road resources for the maneuver, and wherein a target road resource of the one or more target road resources indicates dynamic location information associated with the target road resource.

Aspect 43: The method of Aspect 42, wherein the dynamic location information associated with the target road resource indicates: a dynamic front location of the target road resource; a dynamic rear location of the target road resource; and a speed associated with the target road resource.

Aspect 44: The method of Aspect 43, wherein the dynamic location information is identified in the maneuver message using at least one of: a position of the dynamic front location of the target road resource at a first time, a position of the dynamic rear location of the target road resource at the first time, or an indication of the speed associated with the target road resource.

Aspect 45: The method of any of Aspects 42-44, wherein the dynamic location information associated with the target road resource indicates: a dynamic location of the target road resource, wherein the dynamic location of the target road resource is a dynamic front location or a dynamic rear location; and a speed associated with the target road resource.

Aspect 46: The method of Aspect 45, wherein the dynamic location information is identified in the maneuver message using at least one of: an identifier indicating that the dynamic location of the target road resource is associated with the dynamic front location or the dynamic rear location, a position of the dynamic location of the target road resource at a first time, a distance identifier indicating a distance from the position of the dynamic location to the opposite end of the target road resource, or an indication of the speed associated with the target road resource.

Aspect 47: An apparatus for wireless communication at a device, comprising a processor; memory coupled with the processor; and instructions stored in the memory and executable by the processor to cause the apparatus to perform the method of one or more Aspects of Aspects 1-23.

Aspect 48: A device for wireless communication, comprising a memory and one or more processors coupled to the memory, the memory and the one or more processors configured to perform the method of one or more Aspects of Aspects 1-23.

Aspect 49: An apparatus for wireless communication, comprising at least one means for performing the method of one or more Aspects of Aspects 1-23.

Aspect 50: A non-transitory computer-readable medium storing code for wireless communication, the code comprising instructions executable by a processor to perform the method of one or more Aspects of Aspects 1-23.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 1-23.

Aspect 52: An apparatus for wireless communication at a device, comprising a processor; memory coupled with the processor; and instructions stored in the memory and executable by the processor to cause the apparatus to perform the method of one or more Aspects of Aspects 24-46.

Aspect 53: A device for wireless communication, comprising a memory and one or more processors coupled to the memory, the memory and the one or more processors configured to perform the method of one or more Aspects of Aspects 24-46.

Aspect 54: An apparatus for wireless communication, comprising at least one means for performing the method of one or more Aspects of Aspects 24-46.

Aspect 55: A non-transitory computer-readable medium storing code for wireless communication, the code comprising instructions executable by a processor to perform the method of one or more Aspects of Aspects 24-46.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 24-46.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit a maneuver message for a maneuver of a vehicle associated with the UE;
perform a negotiation, with one or more other UEs, associated with the maneuver message, wherein the negotiation includes at least one of:
indicate, in the maneuver message, one or more remote vehicle (RV) maneuvers for acceptance, or
receive, from a UE of the one or more other UEs, a response to the maneuver message indicating a suggested maneuver for the vehicle of the UE; and
perform an action based at least in part on performing the negotiation, wherein
performing the action includes,
determine that the maneuver has been granted based at least in part on performing the negotiation, wherein one or more responses to the maneuver message indicate an acceptance of the maneuver, and
transmit, to the one or more other UEs, a granted maneuver message identifying a target road resource for the maneuver.

2. The UE of claim 1, wherein the response indicating the suggested maneuver for the vehicle of the UE indicates a rejection of the maneuver, and
wherein the suggested maneuver is based at least in part on a target road resource for the maneuver.

3. The UE of claim 2, wherein a suggested road resource for the suggested maneuver has a same format as the target road resource for the maneuver.

4. The UE of claim 2, wherein the one or more processors are further configured to:
transmit a second maneuver message for a second maneuver of the vehicle associated with the UE, wherein the second maneuver message identifies a second target road resource, and wherein the second target road resource is based at least in part on a suggested road resource for the suggested maneuver.

5. The UE of claim 1, wherein the maneuver message for the maneuver of the vehicle associated with the UE identifies one or more target road resources including:
one or more target road resources for the maneuver of the vehicle associated with the UE; and
one or more target road resources for the one or more RV maneuvers.

6. The UE of claim 5, wherein the one or more target road resources for the maneuver of the vehicle associated with the UE include a vehicle identifier associated with the vehicle associated with the UE.

7. The UE of claim 5, wherein a target road resource of the one or more target road resources for the one or more RV maneuvers is identified by a vehicle identifier associated with a vehicle of the one or more vehicles associated with the one or more other UEs.

8. The UE of claim 1, wherein the maneuver message indicates the one or more RV maneuvers, and
wherein the one or more processors, to perform the negotiation, with the one or more other UEs, associated with the maneuver message, are configured to:
receive a response to the maneuver message, wherein the response indicates:
a rejection of a least one of the maneuver or an RV maneuver of the one or more RV maneuvers, and
the suggested maneuver for the vehicle associated with the UE based at least in part on a target road resource for the maneuver.

9. The UE of claim 1, wherein the one or more processors, to perform the negotiation, with one or more other UEs, associated with the maneuver message, are configured to:
receive a response, from a UE of the one or more other UEs, to the maneuver message, wherein the response indicates a rejection of the maneuver and a suggested RV maneuver for a vehicle associated with the UE of the one or more other UEs, and
wherein the suggested RV maneuver for the vehicle associated with the UE of the one or more other UEs is based at least in part on the one or more RV maneuvers indicated in the maneuver message.

10. The UE of claim 1, wherein the granted maneuver message identifies the target road resource for the maneuver and one or more target road resources for the one or more RV maneuvers.

11. The UE of claim 1, wherein the maneuver message identifies one or more target road resources for the maneuver, and the one or more processors are further configured to:
determine, for a target road resource of the one or more target road resources, dynamic location information associated with the target road resource.

12. The UE of claim 11, wherein the dynamic location information is identified in the maneuver message using at least one of:
a position of a dynamic front location of the target road resource at a first time,
a position of a dynamic rear location of the target road resource at the first time, or
an indication of a speed associated with the target road resource.

13. The UE of claim 11, wherein the one or more processors, to determine the dynamic location information associated with the target road resource, are configured to:
determine a dynamic location of the target road resource, wherein the dynamic location of the target road resource is a dynamic front location or a dynamic rear location; and
determine a speed associated with the target road resource.

14. The UE of claim 11, wherein the dynamic location information is identified in the maneuver message using at least one of:
an identifier indicating that a dynamic location of the target road resource is associated with a dynamic front location or a dynamic rear location,
a position of the dynamic location of the target road resource at a first time,
a distance identifier indicating a distance from the position of the dynamic location to the opposite end of the target road resource, or
an indication of a speed associated with the target road resource.

15. A method of wireless communication performed by a user equipment (UE), comprising:
transmitting a maneuver message for a maneuver of a vehicle associated with the UE;
performing a negotiation, with one or more other UEs, associated with the maneuver message, wherein the negotiation includes at least one of:

indicating, in the maneuver message, one or more remote vehicle (RV) maneuvers for acceptance, or receiving, from a UE of the one or more other UEs, a response to the maneuver message indicating a suggested maneuver for the vehicle of the UE; and performing an action based at least in part on performing the negotiation wherein performing the action includes determining that the maneuver has been granted based at least in part on performing the negotiation, wherein one or more responses to the maneuver message indicate an acceptance of the maneuver, and transmitting, to the one or more other UEs, a granted maneuver message identifying a target road resource for the maneuver.

16. The method of claim 15, wherein the response indicating the suggested maneuver for the vehicle of the UE indicates a rejection of the maneuver, and wherein the suggested maneuver is based at least in part on a target road resource for the maneuver.

17. The method of claim 16, wherein a suggested road resource for the suggested maneuver has a same format as the target road resource for the maneuver.

18. The method of claim 16, further comprising:

transmitting a second maneuver message for a second maneuver of the vehicle associated with the UE, wherein the second maneuver message identifies a second target road resource, and wherein the second target road resource is based at least in part on a suggested road resource for the suggested maneuver.

19. The method of claim 15, wherein the maneuver message for the maneuver of the vehicle associated with the UE identifies one or more target road resources including:

one or more target road resources for the maneuver of the vehicle associated with the UE; and one or more target road resources for the one or more RV maneuvers.

20. The method of claim 19, wherein the one or more target road resources for the maneuver of the vehicle associated with the UE include a vehicle identifier associated with the vehicle associated with the UE.

21. The method of claim 19, wherein a target road resource of the one or more target road resources for the one or more RV maneuvers is identified by a vehicle identifier associated with a vehicle of the one or more vehicles associated with the one or more other UEs.

22. The method of claim 15, wherein the maneuver message indicates the one or more RV maneuvers, and wherein performing the negotiation, with the one or more other UEs, associated with the maneuver message comprises:

receiving a response to the maneuver message, wherein the response indicates:

a rejection of a least one of the maneuver or an RV maneuver of the one or more RV maneuvers, and the suggested maneuver for the vehicle associated with the UE based at least in part on a target road resource for the maneuver.

23. The method of claim 15, wherein performing the negotiation, with one or more other UEs, associated with the maneuver message comprises:

receiving a response, from a UE of the one or more other UEs, to the maneuver message, wherein the response indicates a rejection of the maneuver and a suggested RV maneuver for a vehicle associated with the UE of the one or more other UEs, and wherein the suggested RV maneuver for the vehicle associated with the UE of the one or more other UEs is based at least in part on the one or more RV maneuvers indicated in the maneuver message.

24. The method of claim 16, wherein the granted maneuver message identifies the target road resource for the maneuver and one or more target road resources for the one or more RV maneuvers.

25. The method of claim 15, wherein the maneuver message identifies one or more target road resources for the maneuver, the method further comprising:

determining, for a target road resource of the one or more target road resources, dynamic location information associated with the target road resource.

26. The method of claim 25, wherein the dynamic location information is identified in the maneuver message using at least one of:

a position of a dynamic front location of the target road resource at a first time, a position of a dynamic rear location of the target road resource at the first time, or an indication of a speed associated with the target road resource.

27. The method of claim 25, wherein determining the dynamic location information associated with the target road resource comprises:

determining a dynamic location of the target road resource, wherein the dynamic location of the target road resource is a dynamic front location or a dynamic rear location; and determining a speed associated with the target road resource.

28. The method of claim 25, wherein the dynamic location information is identified in the maneuver message using at least one of:

an identifier indicating that a dynamic location of the target road resource is associated with a dynamic front location or a dynamic rear location, a position of the dynamic location of the target road resource at a first time, a distance identifier indicating a distance from the position of the dynamic location to the opposite end of the target road resource, or an indication of a speed associated with the target road resource.

* * * * *